(12) United States Patent
Chande et al.

(10) Patent No.: US 8,849,337 B2
(45) Date of Patent: Sep. 30, 2014

(54) CONTROLLING ACCESS POINT TRANSMIT POWER BASED ON EVENT-TRIGGERED ACCESS TERMINAL MESSAGING

(75) Inventors: Vinay Chande, San Diego, CA (US); Farhad Meshkati, San Diego, CA (US); Chirag Sureshbhai Patel, San Diego, CA (US); Mehmet Yavuz, San Diego, CA (US); Sumeeth Nagaraja, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 512 days.

(21) Appl. No.: 13/030,509

(22) Filed: Feb. 18, 2011

(65) Prior Publication Data

US 2012/0046026 A1 Feb. 23, 2012

Related U.S. Application Data

(60) Provisional application No. 61/306,885, filed on Feb. 22, 2010.

(51) Int. Cl.
| | |
|---|---|
| H04B 7/00 | (2006.01) |
| H04W 36/00 | (2009.01) |
| H04W 52/18 | (2009.01) |
| H04W 52/34 | (2009.01) |
| H04W 52/16 | (2009.01) |
| H04W 24/10 | (2009.01) |

(52) U.S. Cl.
CPC .............. *H04W 52/34* (2013.01); *H04W 52/18* (2013.01); *H04W 24/10* (2013.01); *H04W 52/16* (2013.01); *H94W 52/143* (2013.01)
USPC ............... 455/522; 455/69; 455/443; 455/444

(58) Field of Classification Search
CPC ............ H04W 84/045; H04W 52/241; H04W 52/244
USPC ............... 455/522, 67.11, 68–70, 115.3, 126, 455/127.1, 127.2, 135, 226.3, 277.2, 296, 455/424, 426.1, 435.2, 436–444, 449, 450; 370/318, 328
See application file for complete search history.

(56) References Cited

U.S. PATENT DOCUMENTS

| | | | |
|---|---|---|---|
| 7,206,598 B2 | 4/2007 | Attar et al. | |
| 7,257,101 B2 * | 8/2007 | Petrus et al. | 370/332 |

(Continued)

FOREIGN PATENT DOCUMENTS

| | | |
|---|---|---|
| EP | 1845632 A1 | 10/2007 |
| EP | 2150069 A1 | 2/2010 |

(Continued)

OTHER PUBLICATIONS

3rd Generation Partnership Project, Technical Specification Group Radio Access Networks, Home Node B Radio Frequency (RF) Requirements (FDD) (Release 9), 3GPP Standard, 3GPP TR 25.967, 3RD Generation Partnership Project (3GPP), Mobile Competence Centre, 650, Route Des Lucioles, F-06921 Sophia-Antipolis Cedex, France, No. 9.0.0, May 1, 2009, pp. 1-55, XP050369580, paragraph [0007].

(Continued)

*Primary Examiner* — Dominic E Rego

(57) ABSTRACT

Transmit power for an access point is controlled based on measurement reports received by the access point from one or more access terminals that are not currently being served by the access point. In some aspects, transmit power is controlled based on the number of received messages that correspond to a particular event. In some aspects, transmit power is controlled based on the contents of the received messages. For example, the access point may use signal strength information included in the messages to determine a level of transmit power that mitigates interference at a defined subset of reporting access terminals.

36 Claims, 15 Drawing Sheets

(56) References Cited

U.S. PATENT DOCUMENTS

| | | | |
|---|---|---|---|
| 7,471,622 B2 | 12/2008 | You et al. | |
| 7,636,573 B2 | 12/2009 | Walton et al. | |
| 8,233,902 B2* | 7/2012 | Kim et al. | 455/436 |
| 2004/0110473 A1* | 6/2004 | Rudolf et al. | 455/69 |
| 2004/0192305 A1* | 9/2004 | Namiki et al. | 455/435.1 |
| 2005/0096061 A1 | 5/2005 | Ji et al. | |
| 2005/0245278 A1* | 11/2005 | Vannithamby et al. | 455/522 |
| 2007/0019596 A1* | 1/2007 | Barriac et al. | 370/338 |
| 2007/0042799 A1* | 2/2007 | Jubin et al. | 455/522 |
| 2007/0103292 A1 | 5/2007 | Burkley et al. | |
| 2007/0127407 A1 | 6/2007 | Attar et al. | |
| 2007/0149201 A1* | 6/2007 | Dominique et al. | 455/442 |
| 2007/0149238 A1* | 6/2007 | Das et al. | 455/522 |
| 2008/0137562 A1* | 6/2008 | Li et al. | 370/280 |
| 2009/0005105 A1* | 1/2009 | Hwang et al. | 455/522 |
| 2009/0042593 A1 | 2/2009 | Yavuz et al. | |
| 2009/0047956 A1* | 2/2009 | Moe et al. | 455/436 |
| 2009/0147736 A1 | 6/2009 | Chen et al. | |
| 2009/0245207 A1* | 10/2009 | Rao | 370/332 |
| 2009/0280853 A1 | 11/2009 | Brisebois et al. | |
| 2009/0286496 A1 | 11/2009 | Yavuz et al. | |
| 2009/0318182 A1 | 12/2009 | Nagato et al. | |
| 2009/0323663 A1* | 12/2009 | Nakatsugawa | 370/343 |
| 2010/0048212 A1 | 2/2010 | Yavuz et al. | |
| 2010/0048224 A1* | 2/2010 | Klatt | 455/456.1 |
| 2010/0087203 A1* | 4/2010 | Lee et al. | 455/452.2 |
| 2010/0135174 A1 | 6/2010 | Mori | |
| 2010/0238901 A1* | 9/2010 | Sampath et al. | 370/331 |
| 2010/0273432 A1 | 10/2010 | Meshkati et al. | |
| 2010/0273471 A1 | 10/2010 | Meshkati et al. | |
| 2010/0273473 A1 | 10/2010 | Meshkati et al. | |
| 2010/0273481 A1 | 10/2010 | Meshkati et al. | |
| 2010/0298017 A1 | 11/2010 | Dalsgaard et al. | |
| 2011/0047029 A1* | 2/2011 | Nair et al. | 705/14.52 |
| 2011/0105128 A1* | 5/2011 | Narasimha | 455/442 |
| 2012/0039265 A1 | 2/2012 | Patel et al. | |
| 2012/0046063 A1 | 2/2012 | Chande et al. | |
| 2012/0142392 A1 | 6/2012 | Patel et al. | |
| 2012/0252453 A1 | 10/2012 | Nagaraja et al. | |

FOREIGN PATENT DOCUMENTS

| | | |
|---|---|---|
| JP | 2001339341 A | 12/2001 |
| JP | 2008523646 A | 7/2008 |
| JP | 2010004187 A | 1/2010 |
| JP | 2010016420 A | 1/2010 |
| KR | 20100017215 A | 2/2010 |
| WO | WO-2007052810 A1 | 5/2007 |
| WO | WO2008084371 A2 | 7/2008 |
| WO | WO-2008136415 A1 | 11/2008 |
| WO | WO2008147297 A2 | 12/2008 |
| WO | WO-2009044318 A2 | 4/2009 |

OTHER PUBLICATIONS

Assignment of parameters for slow transmit power control (Revised), 3GPP Draft; R2-99B04, 3rd Generation Partnership Project (3GPP), Mobile Competence Centre ; 650, Route Des Lucioles ; F-06921 Sophia-Antipolis Cedex ; France, vol. Ran WG2, No. Sweden; 19990920, Sep. 20, 1999, XP050113647, [retrieved on 1999-09-201 the whole document.

International Search Report and Written Opinion—PCT/US2011/025557—ISA/EPO—May 27, 2011.

International Search Report and Written Opinion—PCT/US2011/025555—ISA/EPO—Jul. 20, 2011.

NEC: "HeNB Power Control Based on HUE Measurement" 3GPP Draft; R4-100019, 3rd Generation Partnership Project (3GPP), Mobile Competence Centre ; 650, Route Des Lucioles ; F-06921 Sophia-Antipolis Cedex ; France, vol. RAN WG4, No. Sophia; 20100118, Jan. 12, 2010, XP050427758, [retrieved on Jan. 12, 2010] the whole document.

Nokia Siemens Networks et al: "Text Proposal for TR36.921: Interference control for LTE Rel-9 HeNB cells", 3GPP Draft; R4-100235, 3rd Generation Partnership Project (3GPP), Mobile Competence Centre ; 650, Route Des Lucioles ; F-06921 Sophia-Antipolis Cedex ; France, vol. RAN WG4, No. Sophia; 20100118, Jan. 20, 2010, XP050427923, [retrieved on Jan. 20, 2010] the whole document.

Patel C, et al., "Femtocell and Beacon Transmit Power Self-Calibration", Internet Citation, [Online] pp. 1-8, XP002637750, Retrieved from the Internet: URL:http://www.qualcomm.com/documents/files/femtocell-and-beacon-transmitpower-self-calibration.pdf> [retrieved on May 16, 2011].

Yavuz M et al: "Interference management and performance analysis of UMTS/HSPA+ femtocell s" IEEE Communications Magazine, IEEE Service Center, Piscataway, US, vol. 47, No. 9, Sep. 1, 2009, pp. 102-109, XP011283371, ISSN: 0163-6804, DOI : DOI : 10.1109/MCOM. 2009.5277462 the whol e document.

Taiwan Search Report—TW100105669—TIPO—Oct. 1, 2013.

Co-pending U.S. Appl. No. 14/159,294, filed Jan. 20, 2014.

* cited by examiner

CONTROLLING ACCESS POINT TRANSMIT POWER BASED ON EVENT-TRIGGERED ACCESS TERMINAL MESSAGING

CLAIM OF PRIORITY

This application claims the benefit of and priority to commonly owned U.S. Provisional Patent Application No. 61/306,885, filed Feb. 22, 2010, the disclosure of which is hereby incorporated by reference herein.

CROSS-REFERENCE TO RELATED APPLICATION

This application is related to concurrently filed and commonly owned U.S. patent application Ser. No. 13/030,552, entitled "CONTROLLING ACCESS POINT TRANSMIT POWER BASED ON ACCESS TERMINAL RANKING," the disclosure of which is hereby incorporated by reference herein.

BACKGROUND

1. Field

This application relates generally to wireless communication and more specifically, but not exclusively, to controlling access point transmit power.

2. Introduction

A wireless communication network may be deployed over a geographical area to provide various types of services (e.g., voice, data, multimedia services, etc.) to users within that geographical area. In a typical implementation, macro access points (e.g., each of which provides service via one or more cells) are distributed throughout a macro network to provide wireless connectivity for access terminals (e.g., cell phones) that are operating within the geographical area served by the macro network.

As the demand for high-rate and multimedia data services rapidly grows, there lies a challenge to implement efficient and robust communication systems with enhanced performance. To supplement conventional network access points (e.g., to provide extended network coverage), small-coverage access points (e.g., low power access points) may be deployed to provide more robust indoor wireless coverage or other coverage to access terminals inside homes, enterprise locations (e.g., offices), or other locations. Such small-coverage access points may be referred to as, for example, femto cells, femto access points, Home NodeBs, Home eNodeBs, or access point base stations. Typically, such small-coverage access points are connected to the Internet and the mobile operator's network via a DSL router or a cable modem. For convenience, small-coverage access points may be referred to as femto cells or femto access points in the discussion that follows.

In a co-channel or shared carrier deployment of femto cells such as Home Node Bs, there is a need to protect non-Closed Subscriber Group access terminals (also denoted as non-allowed access terminals or macro access terminals) from interference from Home NodeBs by limiting the transmit power of the Home NodeBs for pilot, overhead, data, and other channels. This transmit power control may be referred to as Home NodeB power calibration. One goal of a transmit power calibration algorithm is to strike a balance between Home NodeB coverage provided to served access terminals (e.g., home access terminals) and limiting the interference impact on non-served access terminals (e.g., macro access terminals or other femto access terminals).

Some conventional transmit power calibration schemes are based on measurements made by a downlink receiver (e.g., a Network Listen Module) at the Home NodeB. This calibration is based on the assumption that nearby home access terminals and nearby macro access terminals will see the same or similar RF conditions as the Network Listen Module. This assumption is not fully accurate, however. Consequently, Network Listen Module-based transmit power calibration suffers from two mismatch conditions.

First, there may be an RF mismatch condition. For example, a Home NodeB placed near a window may see significantly higher macro interference than a home access terminal which may be predominantly away from the window. As another example, a Home NodeB placed in a basement may see significantly lower macro interference than a home access terminal which is predominantly in a higher floor.

Second, there may a deployment mismatch condition. For example, the Network Listen Module is unaware of the macro access terminal traffic surrounding the Home NodeB deployment. A Home NodeB deployed near a busy street corner in a small apartment may affect more macro access terminals than one deployed deep inside a suburban home. This mismatch creates an inaccurate power setting for the Home NodeB in the sense that the power setting may create too much interference for macro users. This interference could lead to excessive inter-frequency handovers or call drops (e.g., when the Home NodeB is placed near a window or near a busy street corner) or could result in inadequate coverage for home access terminals (e.g., when the Home NodeB is placed in a basement or when the Home NodeB is used in a ranch house).

In view of the above, there is a need for effective techniques for protecting macro cell users and other non-allowed users from interference from femto cells while still providing adequate coverage for allowed femto cell users.

SUMMARY

A summary of several sample aspects of the disclosure follows. This summary is provided for the convenience of the reader and does not wholly define the breadth of the disclosure. For convenience, the term some aspects may be used herein to refer to a single aspect or multiple aspects of the disclosure.

The disclosure relates in some aspects to controlling transmit power of an access point. In particular, transmit power for an access point may be controlled based on measurement reports received by the access point from one or more access terminals that are not currently being served by the access point (e.g., access terminals that are in an active call with another access point or that are in idle mode). Such a scheme may be used, for example, to provide transmit power calibration for a femto cell that is operating on a carrier shared with macro access points and/or other femto cells. By effectively learning the boundaries of the femto cell deployment based on received measurement reports, the femto cell may configure its transmit power to limit the number of non-served access terminals (e.g., macro access terminals) affected by interference from the femto cell. Advantageously, such a measurement report-based scheme may mitigate (e.g., eliminate) RF mismatch conditions and/or deployment mismatch conditions that may otherwise exist in a Network Listen Module-based calibration scheme.

The disclosure relates in some aspects to controlling transmit power based on the number of measurement report messages corresponding to a particular event that are received by an access point. In some aspects, an event-based transmit power control scheme may involve: receiving messages at an access point, wherein the messages comprise measurement reports from at least one access terminal that is not currently being served by the access point; identifying a quantity of the messages that indicate the occurrence of a specified type of event; comparing the quantity to a threshold; and controlling transmit power of the access point based on the comparison.

The disclosure relates in some aspects to controlling transmit power based on the contents of received measurement report messages. For example, an access point may use signal strength information included in the messages to rank reporting access terminals and determine a level of transmit power that mitigates interference at a defined subset of the reporting access terminals. In some aspects, a ranking-based transmit power control scheme may involve: receiving messages at an access point, wherein the messages comprise measurement reports from a plurality of access terminals that are not currently being served by the access point; ranking the access terminals based on the received messages, wherein the ranking corresponds to signal conditions at the access terminals that result from transmissions by the access point; designating a subset of the access terminals based on the ranking; and controlling transmit power of the access point to achieve specified signal conditions at the subset of access terminals.

The disclosure relates in some aspects to a network entity that sends measurement reports to an access point that controls transmit power based on received measurement reports. In some aspects, a measurement report handling scheme may involve: receiving measurement reports at a network entity, wherein each of the measurement reports correspond to a specified (i.e., the same) access point; determining that the specified access point controls transmit power based on measurement reports; and sending the measurement reports to the specified access point as a result of the determination.

BRIEF DESCRIPTION OF THE DRAWINGS

These and other sample aspects of the disclosure will be described in the detailed description and the appended claims that follow, and in the accompanying drawings, wherein:

Figure 1:
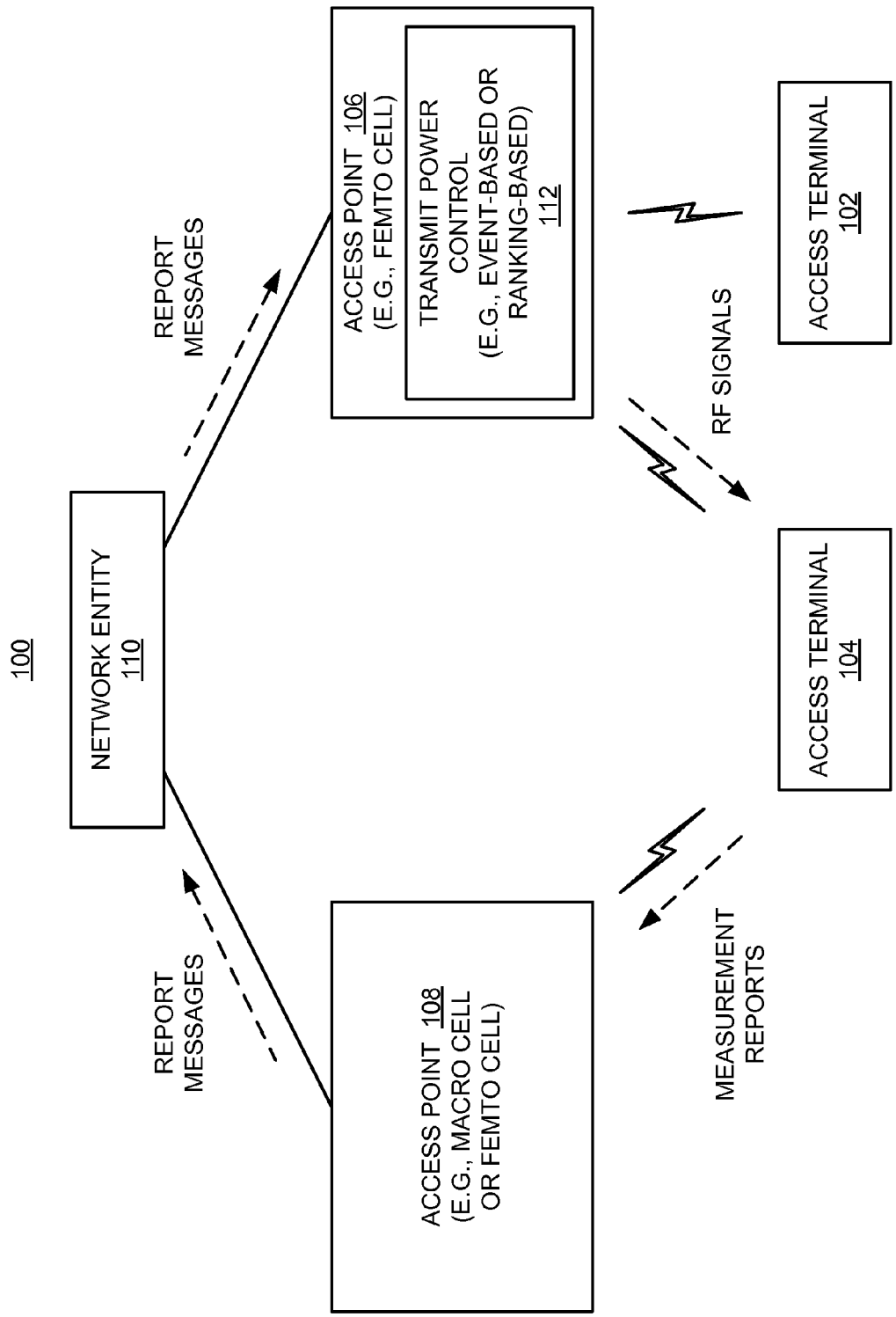
FIG. 1 is a simplified block diagram of several sample aspects of a communication system wherein an access point controls its transmit power based on access terminal measurement reports.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates several nodes of a sample communication system 100 (e.g., a portion of a communication network). For illustration purposes, various aspects of the disclosure will be described in the context of one or more access terminals, access points, and network entities that communicate with one another. It should be appreciated, however, that the teachings herein may be applicable to other types of apparatuses or other similar apparatuses that are referenced using other terminology. For example, in various implementations access points may be referred to or implemented as base stations, NodeBs, eNodeBs, Home NodeBs, Home eNodeBs, macro cells, femto cells, and so on, while access terminals may be referred to or implemented as user equipment (UEs), mobiles, and so on.

Access points in the system 100 provide access to one or more services (e.g., network connectivity) for one or more wireless terminals (e.g., access terminals 102 and 104) that may be installed within or that may roam throughout a coverage area of the system 100. For example, at various points in time the access terminal 102 may connect to an access point 106, an access point 108, or some access point in the system 100 (not shown). Similarly, at various points in time the access terminal 104 may connect to the access point 108 or some access point in the system 100.

Certain types of access points (e.g., femto cells) may be configured to support different types of access modes. For example, in an open access mode, an access point may allow any access terminal to obtain any type of service via the access point. In a restricted (or closed) access mode, an access point may only allow authorized access terminals to obtain service via the access point. For example, an access point may only allow access terminals (e.g., so called home access terminals) belonging to a certain subscriber group (e.g., a closed subscriber group (CSG)) to obtain service via the access point. In a signaling-only (or hybrid) access mode, alien access terminals (e.g., non-home access terminals, non-CSG access terminals) may only be allowed to obtain signaling access via the access point. For example, a macro access terminal that does not belong to a femto cell's CSG may be allowed to perform certain paging, registration, and other signaling operations at the femto cell, but may not be allowed to obtain active mode service via the femto cell.

Each of the access points may communicate with one or more network entities (represented, for convenience, by a network entity 110) to facilitate wide area network connectivity. These network entities may take various forms such as, for example, one or more radio and/or core network entities. Thus, in various implementations the network entities may represent functionality such as at least one of: network management (e.g., via an operation, administration, management, and provisioning entity), call control, session management, mobility management, gateway functions, interworking functions, or some other suitable network functionality. Also, two of more of these network entities may be co-located and/or two or more of these network entities may be distributed throughout a network.

The access point 106 (e.g., a femto cell) provides service for nearby access terminals through the use of a service channel that operates on a designated carrier frequency. In some cases (e.g., co-channel deployments), this carrier frequency may be used by different types of access points (e.g., femto cells and macro cells). In other cases, different types of access points may operate on different carrier frequencies. For example, femto cells may deploy their service channels on a dedicated femto carrier frequency, while macro cells may deploy their service channels on one or more macro carrier frequencies. In the latter case, a femto cell may transmit beacons on each macro carrier frequency to enable nearby access terminals operating on that carrier frequency to find the femto cell. Thus, in either a co-channel or a non-co-channel deployment scenario, transmissions by a femto cell on a given carrier frequency may interfere with signal reception at a nearby access point that is in active communication with another access point (e.g., a macro cell or another femto cell).

The potentially interfering transmissions by an access point may take various forms. For example, in a co-channel deployment, a femto cell's forward link transmissions (e.g., for the service channel) may cause interference at nearby macro access terminals operating on the same carrier frequency. As another example, in a deployment where a femto cell transmits beacons on a macro carrier frequency, these beacon transmissions may cause interference at nearby macro access terminals operating on that macro carrier frequency. In some implementations, an access point transmits beacons at different power levels. Here, the access point will normally transmit beacons at a low power level in an attempt to minimize interference caused by the beacons. However, the access point will regularly transmit beacons at a higher power level (or multiple higher levels) for short periods of time to facilitate attracting access terminals from a greater distance.

The access point 106 employs transmit power control to provide a desired area of communication coverage for attracting and/or communicating with access terminals (e.g., the access terminal 102) that are authorized to receive active mode service from the access point 106, while mitigating interference that transmissions by the access point 106 may have on nearby access terminals (e.g., the access terminal 104) that are not currently being served by (e.g., not authorized to receive active mode service from) the access point 106. For example, the access terminal 102 may be a member of a CSG of the access point 106 while the access terminal 104 is not a member of that CSG. In this case, it is desirable for the access point 106 to use sufficient transmit power (e.g., for beacon and/or forward link transmissions) so that the access terminal 102 is able to detect the presence of the access point 106 and/or communicate with the access point 106 from a particular distance (e.g., throughout a building within which the access point 106 is deployed). Conversely, it is preferable that the transmissions by the access point 106 do not unduly interfere with the ability of the access terminal 104 to receive signals from the access point 108 (e.g., a serving macro cell for the access terminal 104).

In accordance with the teachings herein, the access point 106 employs a transmit power control scheme that is based on measurement reports from one or more access terminals that are not currently being served by the access point 106. Through the use of such a scheme, calibration of access point transmit power may be achieved in a manner that takes into account deployment-specific scenarios such as the size of the building within which the access point is deployed and the number of affected non-served access terminals (e.g., non-allowed access terminals such as macro access terminals) in the vicinity of the access point. Consequently, a better tradeoff may be achieved between coverage of an access point (e.g., a closed femto cell) and interference to non-served access terminals. An example of messaging operations that may be performed in conjunction with such a transmit power control scheme will now be described in conjunction with FIG. 2.

Figure 2:
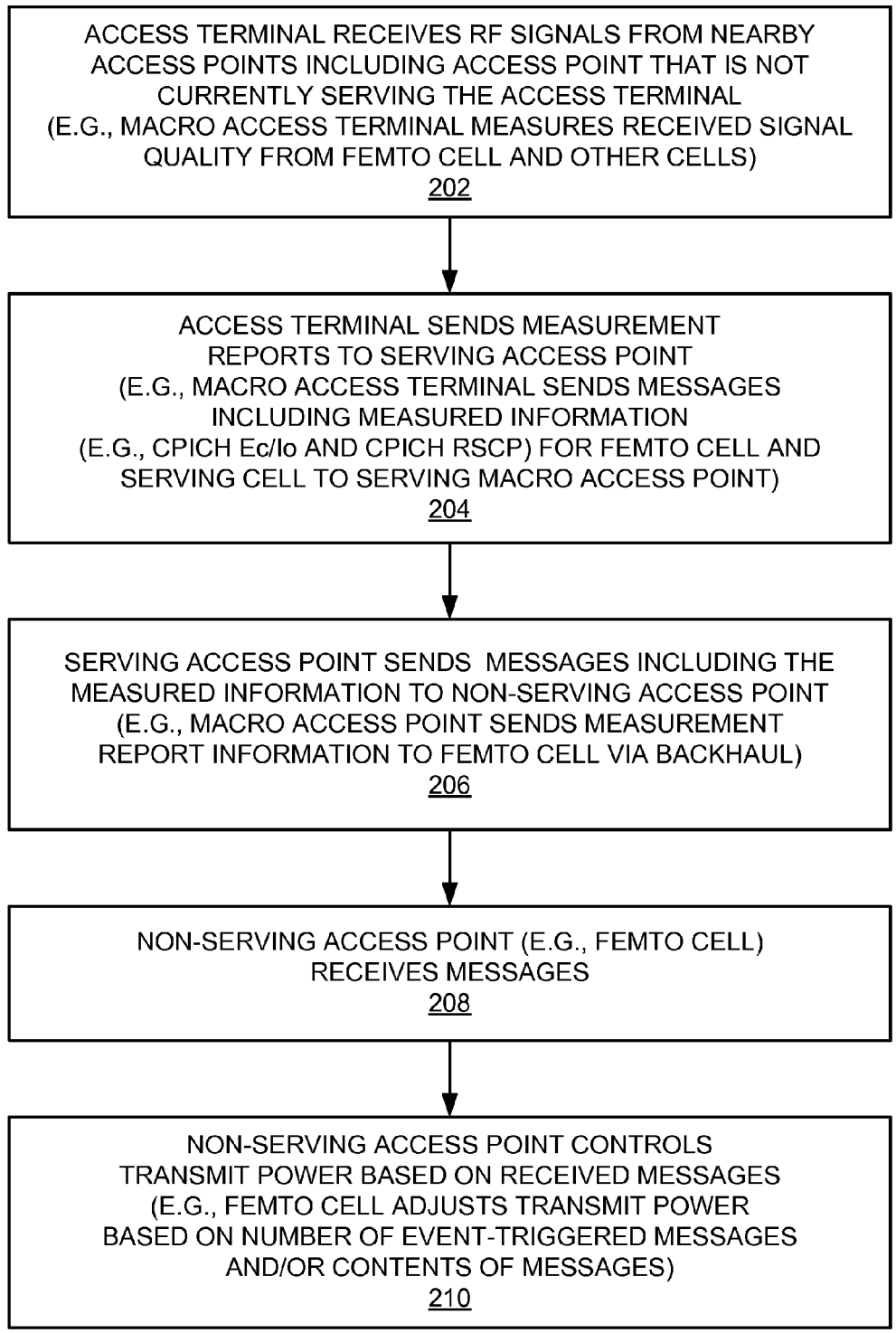
FIG. 2 is a flowchart of several sample aspects of operations that may be performed in conjunction with controlling transmit power of an access point based on access terminal measurement reports.
Figure 8:
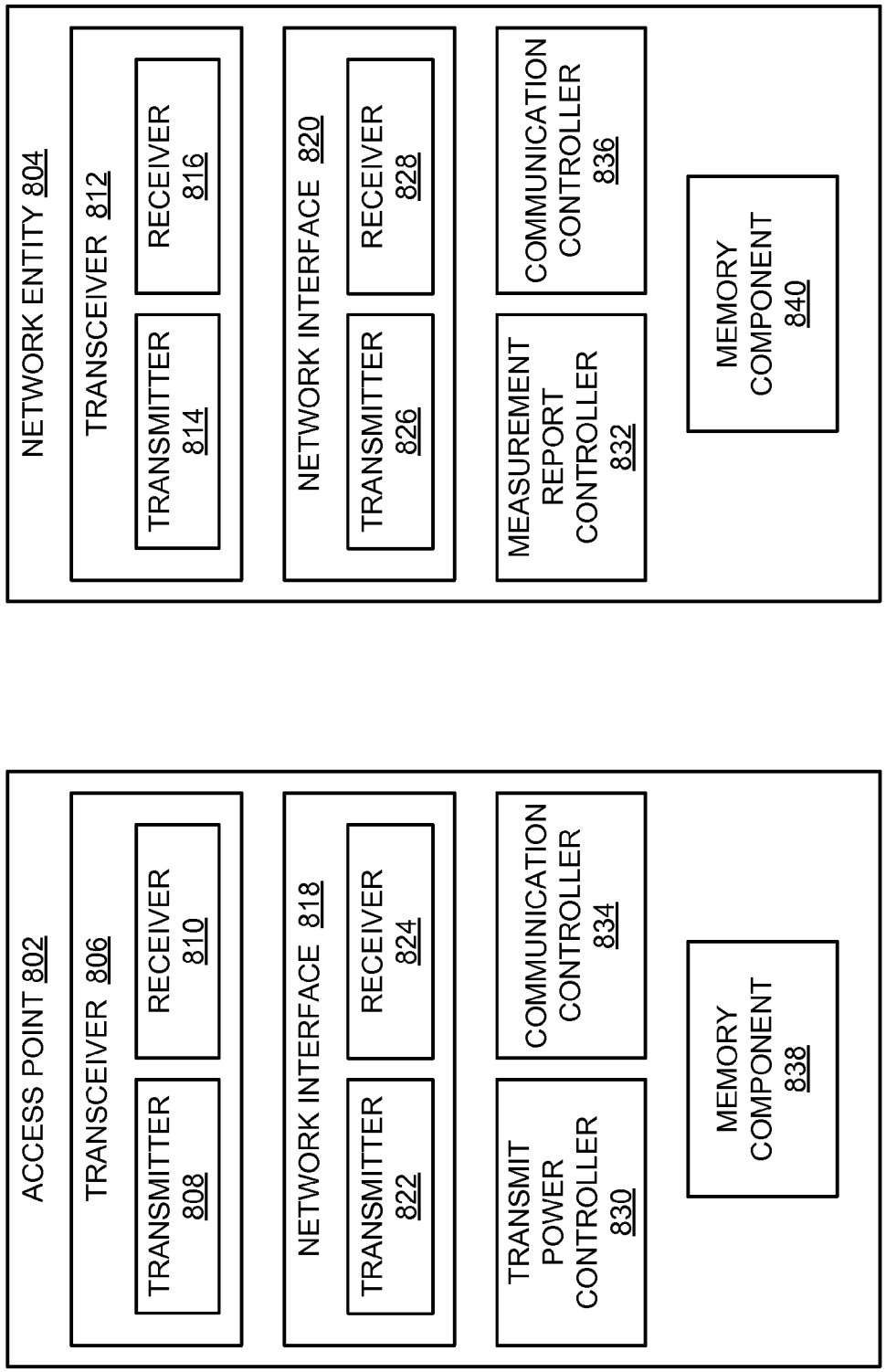
FIG. 8 is a simplified block diagram of several sample aspects of components that may be employed in communication nodes.

For convenience, the operations of FIG. 2 (or any other operations discussed or taught herein) may be described as being performed by specific components (e.g., the components of FIG. 1 and FIG. 8). It should be appreciated, however, that these operations may be performed by other types of components and may be performed using a different number of components. It also should be appreciated that one or more of the operations described herein may not be employed in a given implementation.

As represented by block 202 of FIG. 2, at various points in time, the access terminal 104 receives RF signals (e.g., forward link signals, pilot signals) from nearby access points and measures the received signal quality of these RF signals. The access points from which these RF signals are received will include the access point (e.g., the access point 108) currently serving the access terminal 104 and may include other access points (e.g., the access point 106) that are not currently serving the access terminal 104.

As represented by block 204, the access terminal 104 generates measurement report messages based on the RF signal measurements and sends these messages to its serving access point 108. For example, an access terminal may be configured or requested to provide periodic or event-triggered measurement report messages (MRMs) to its serving access point (e.g., a serving base station) or to some other network entity (e.g., a radio network controller).

In some aspects, these measurement reports convey the radio conditions and surrounding access points seen by the access terminal. That is, a measurement report provides an indication of the identity of each observed access point and provides an indication of the received signal quality of RF signals measured at the access terminal 104. For example, a measurement report may include received signal quality parameters such as pilot signal strength (e.g., CPICH RSCP) for a serving macro cell, for a nearby femto cell, and for other nearby cells. As another example, a measurement report may indicate the total wideband received power on a carrier (e.g., Io or received signal strength indication (RSSI)). As yet another example, a measurement report may include derived parameters such CPICH Ec/Io for a serving macro cell, for a nearby femto cell, and for other nearby cells.

From these parameters and additional information such as the value of the access point's transmit power, estimates of quantities such as the path loss from the access terminal to the access point may be obtained. Classically, these measurements reports have been used by the network for access terminal mobility (i.e., used to make handover decisions for the access terminal).

As represented by block 206, instead of using this information exclusively for mobility operations, the access point 108 sends report messages that include the measurement information for the non-serving access point 106 to the access point 106. For example, these report messages may comprise the measurement reports received at block 204 or these report messages may simply include some of the measurement report information from the measurements reports. The access point 108 may send the report messages to the access point 106 via the network entity 110 or, in some cases, directly.

As an example of the case where message reports are sent via the network entity 110 (e.g., representing a series of network entities), the access point may send the report messages via the network backhaul whereby the network entity 110 sends corresponding report messages to the access point 106. In some cases, the access point 108 and/or the network entity 110 may simply forward received measurement reports to the access point 106. In other cases, as discussed in more detail below in conjunction with FIG. 5, the access point 108 and/or the network entity 110 may process the received measurement report information in conjunction with sending the report messages to the access point 106. For example, the access point 108 and/or the network entity 110 may aggregate any received messages and periodically send a group of messages to the access point 106.

As an example of the case where message reports are sent directly to the access point 106, some communication networks support non-backhaul signaling connections between access points. For example, in a case where the access points 106 and 108 are both femto cells, the access points 106 and 108 may be able to directly communicate with one another (e.g., via a femto (e.g., Home NodeB) management server).

As represented by block 208, the non-serving access point 106 receives the messages that include the measurement information that originated at the access terminal 104. As discussed in more detail below in conjunction with FIG. 5, these messages may be received on an individual basis (e.g., as each measurement report is generated) or on an aggregate basis (e.g., groups of messages may be collected and sent periodically by a network entity).

As represented by block 210, the access point 106 (e.g., by operation of a transmit power control component 112) controls transmit power of the access point 106 based on the received report messages. For example, as discussed in more detail below in conjunction with FIG. 3, in some implementations the transmit power control component 112 employs an event-based transmit power control algorithm whereby transmit power is adjusted based on the number of received report messages that are associated with a particular event (e.g., messages that are triggered by the occurrence of a specific event at the access terminal 104). As another example, as discussed in more detail below in conjunction with FIG. 4, in some implementations the transmit power control component 112 employs a ranking-based transmit power control algorithm whereby transmit power is adjusted based on a ranking of signal conditions at different reporting access terminals.

Figure 3:
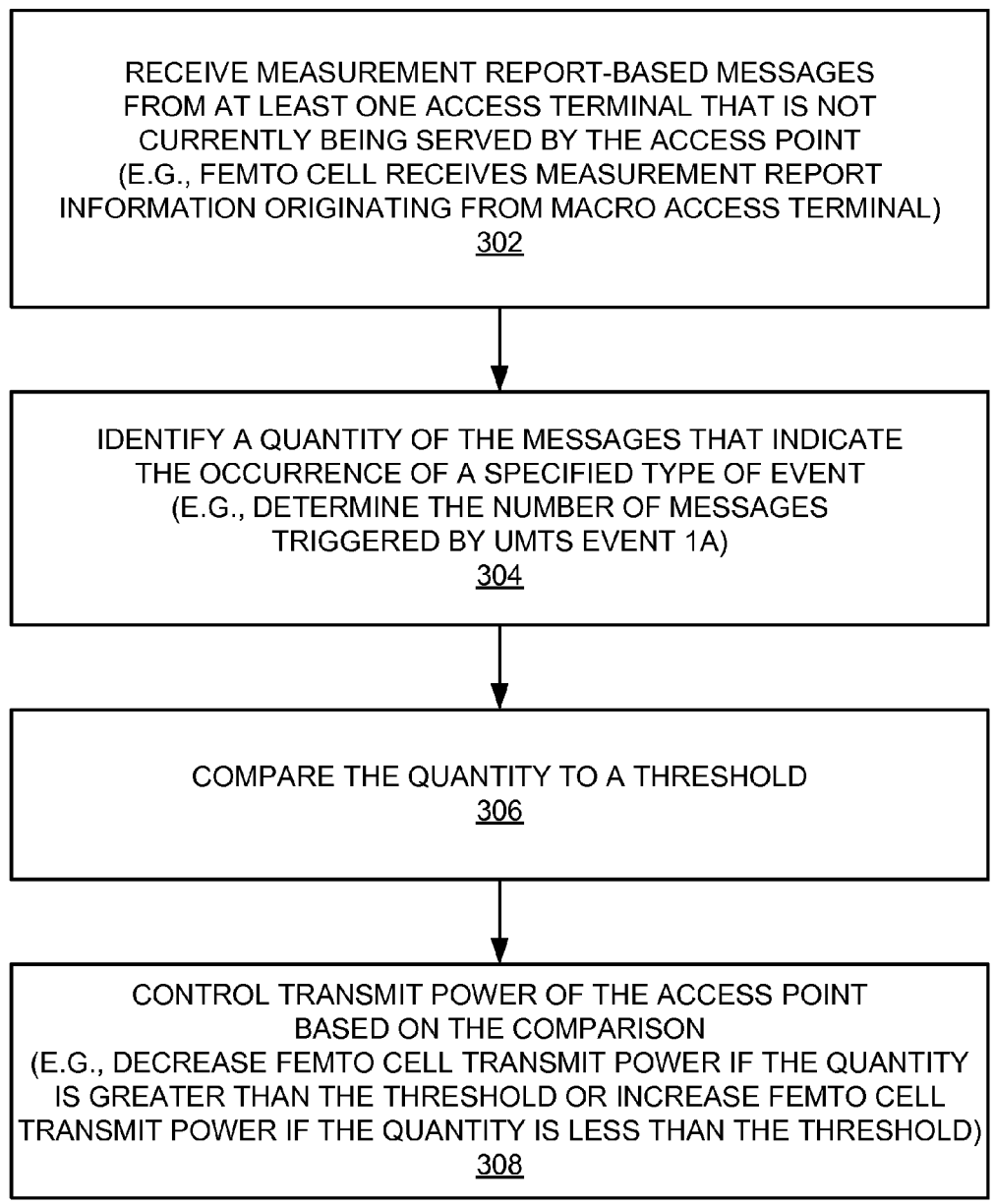
FIG. 3 is a flowchart of several sample aspects of operations that may be performed in conjunction with controlling transmit power of an access point based on event-triggered measurement reports.

Referring to FIG. 3, this flowchart describes an example of an event counting-based algorithm that may be employed at an access point to control transmit power. Here, the events relate to measurement report generation at non-served access terminals that are in the vicinity of the access point.

Typically, measurement report message generation at an access terminal is event triggered. For example, an access terminal may generate a measurement report when the signal strength of an observed access point exceeds a threshold. This threshold may take the form of, for example, an absolute value or a value relative to the best signal strength observed. One example of such an event is Event 1A defined in UMTS.

A large number of measurement reports corresponding to a particular type of event by non-served access terminals may indicate leakage of access point transmit power outside of the building (e.g., a femto cell user's home) where the access point is deployed. Consequently, if the number of measurement report triggering events that occur at non-served access terminals is above a certain configurable threshold, the transmit power of the access point and therefore the coverage range of the access point is reduced to mitigate interference at these access terminals. Conversely, if the number of events is less than the same or some other threshold, the transmit power is increased to improve coverage for allowed access terminals (e.g., home access terminals).

Accordingly, as represented by block 302 of FIG. 3, at various points in time, an access point will receive measurement report-based messages from one or more access terminals that are not currently being served by the access point. For example, a femto cell may receive measurement reports generated by a nearby macro access terminal or by a nearby access terminal that is being served by another femto cell. As discussed above, a reporting access terminal may send measurements reports to its serving access point after which the measurement report (or other suitable message) is sent to the femto cell (e.g., via the backhaul or in some other manner).

As represented by block 304, the access point identifies the quantity of received messages that indicate the occurrence of a specified type of event. Here, the quantity may be calculated over a defined period of time (e.g., a day, a week, etc.).

For example, in an UMTS-based system, a femto cell may count the number of a received measurement reports that were triggered by the occurrence of Event 1A at the reporting access terminal(s). For example, an Event 1A at a macro access terminal may correspond to the received signal power from a femto cell being within a defined threshold (e.g., a defined dB amount) of the received signal power from the macro access terminal's serving macro cell. In conjunction with such an event, the macro access terminal may attempt to add the femto cell to the macro access terminal's active set for handover-related operations.

As represented by block 306, the access point compares the quantity determined at block 304 to a threshold. It should be appreciated that more than one threshold may be employed in some cases. For example, one threshold may be used to determine whether transmit power should be decreased and another (e.g., lower) threshold may be used to determine whether transmit power should be increased.

As represented by block 308, the access point controls its transmit power based on the comparison of block 306. For example, the transmit power may be decreased if the quantity is greater than (or greater than or equal to) a threshold, while the transmit power may be increased if the quantity is less than (or less than or equal to) a threshold.

As a specific example, at defined update intervals, the access point may update its transmit power level based on the formula: Pnew=Pcurrent+ΔP. In some implementations, the power adjustment ΔP is computed based on the comparison of the quantity of measurement report events with a threshold.

As a specific example, the measurement reports corresponding to an event of certain type (e.g., Event 1A) are counted during an update period. Let the number of these events be denoted by Observed_Event_Count. This quantity is then compared with a configurable threshold, Target_Event_Count, which controls the desired number of such events in the update period. ΔP is then computed according to the formula: ΔP=g(Target_Event_Count−Observed_Event_Count). Here, g(x) may comprise a monotonic non-decreasing function which takes the value 0 for x=0 (i.e., the transmit power is unchanged if the target is met).

In the above example, the direction of the transmit power adjustment (e.g., increase or decrease) as well as the magnitude of the transmit power adjustment is based on the difference between the observed count and the target count. Accordingly, if the number of events is significantly different than the target, a relatively large transmit power adjustment may be made. Conversely, if the number of events is relatively close to the target, a relatively small transmit power adjustment may be made. In either case, the newly calculated transmit power (Pnew) may be constrained by minimum and maximum transmit power limits (e.g., as specified for the access point and/or by another transmit power control algorithm).

Figure 4:
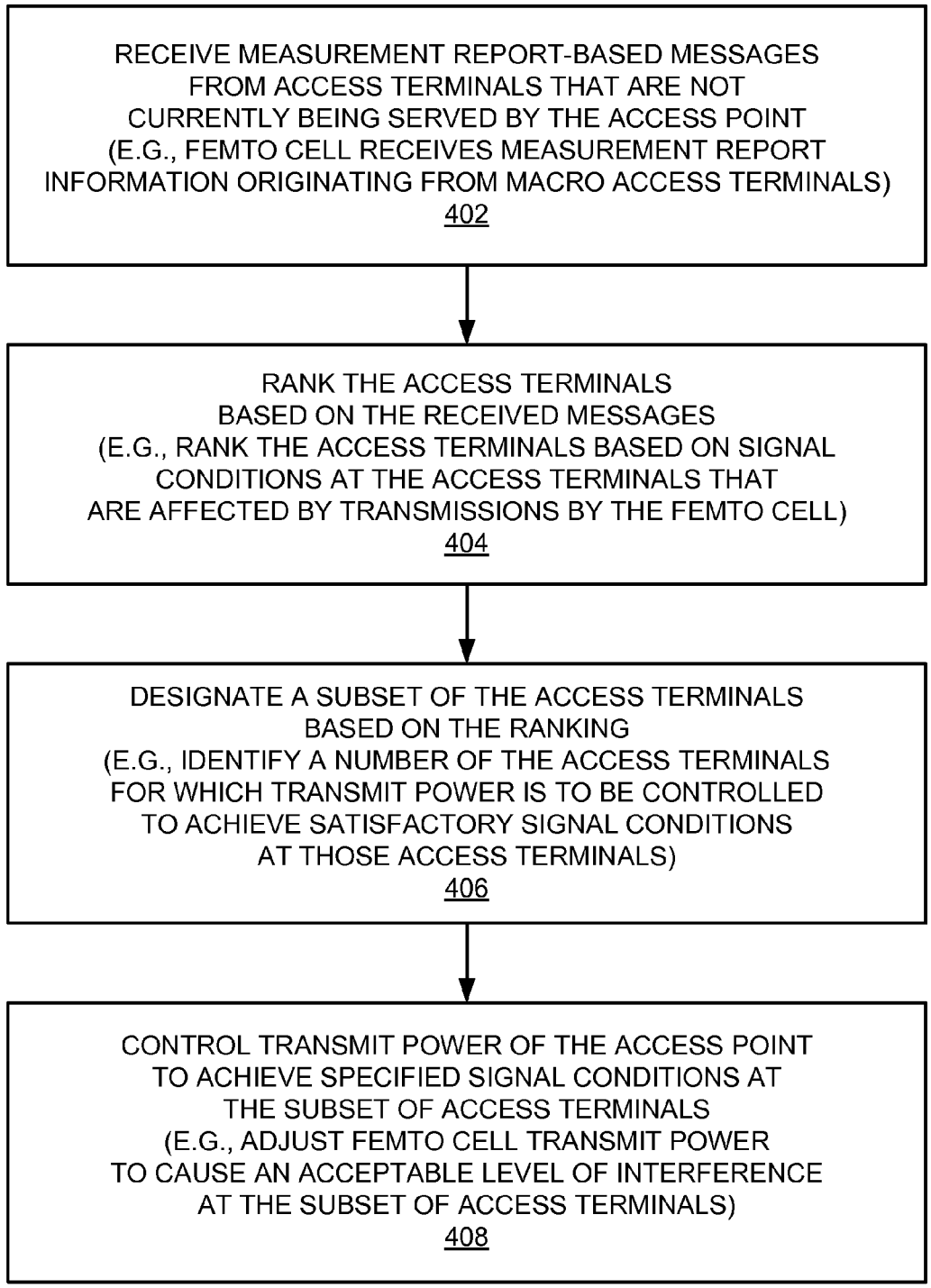
FIG. 4 is a flowchart of several sample aspects of operations that may be performed in conjunction with controlling transmit power of an access point based on a ranking of access terminal measurement reports.

Referring now to FIG. 4, this flowchart describes an example of a measurement report content-based algorithm that may be employed at an access point to control transmit power. Here, the contents of received measurement reports are examined to obtain a subset of measurement reports that are useful for computation of the transmit power setting. Thus, in this case, the transmit power is determined not just based on the number of measurement reports, but also based on the contents of the measurement reports.

Such an algorithm may prove particularly advantageous, for example, in implementations where the measurement reports consist of both event triggered reports and periodic reports. For example, event triggered reports (e.g., based on Event 1A or some other event) may occur when a macro access terminal is at the boundary of femto cell coverage and macro cell coverage. On the other hand, measurement reports under periodic reporting may be generated anywhere within the femto cell coverage. Consequently, periodic reporting may provide more detailed information regarding interference conditions in the vicinity of the femto cell.

As represented by block 402 of FIG. 4, at various points in time, an access point may receive measurement report-based messages from different access terminals that are not currently being served by the access point. For example, a femto cell may receive measurements reports originating from different macro access terminals that are passing by the femto cell. In addition, the femto cell may receive measurements reports originating from different access terminals that are served by other femto cells in the vicinity of the femto cell.

The received messages are grouped according to the originating access terminal. For example, the messages originating from a first macro access terminal are placed in one group, the messages originating from a second macro access terminal are placed in another group, the messages originating from an access terminal being served by another femto cell are placed in yet another group, and so on.

The grouping of these messages may be performed at various entities in the system. In some cases, the destination access point (e.g., the femto cell) for the messages performs the grouping. In some cases, a network entity performs the grouping. For example, a network entity such as a radio network controller may aggregate all messages it receives according to the originating access terminals. The network entity may then send the grouped messages to the destination access point. In some cases, a serving access point (e.g., a macro cell or other femto cell) that receives measurement reports from originating access terminals may group these measurement reports according to the originating access terminal.

As represented by block 404, the access terminals are ranked based on the received messages. For example, based on information indicative of signal conditions (e.g., Ec/Io, CPICH RSCP) included in each group of messages, the access terminals may be ranked according to how the access terminals are impacted by interference from the access point.

As a specific example, for each group of measurement reports, the measurement reports indicating the worst impact of the femto cell on the corresponding access terminal (e.g., macro access terminal) are selected. In other words, for each access terminal, the worst reported signal conditions are identified from that access terminal's measurement report group.

The worst signal conditions (impact) may be determined in various ways. In some cases, the worst signal conditions are selected based on the lowest reported serving macro cell signal strength (e.g., CPICH $RSCP_{macro}$ or CPICH $Ec/Io_{macro}$) when the reported femto cell signal strength (e.g., CPICH $RSCP_{femto}$ or CPICH $Ec/Io_{femto}$) is above a certain threshold. Thus, this determination provides an indication of how the transmissions by the femto cell are affecting reception of macro cell signals at the macro access terminal. In some cases, the worst signal conditions are selected based on the highest reported femto cell signal strength. This determination provides an indication of the strength of the femto cell transmissions as seen by the macro access terminal.

Once the worst signal conditions for each access terminal are identified, the access terminals are ranked according to these signals conditions. For example, the macro access terminal reporting the lowest measured macro cell signal strength may be given a rank of "1", the macro access terminal reporting the next lowest macro cell signal strength may be given a rank of "2", and so on. As another example, the macro access terminal reporting the highest measured femto cell signal strength may be given a rank of "1", the macro access terminal reporting the next highest femto cell signal strength may be given a rank of "2", and so on.

As represented by block 406, a subset of the access terminals is designated based on the ranking of block 404. For example, a number of the access terminals associated with the worst signal conditions (e.g., lowest macro cell signal strength or highest femto cell signal strength) may be "excluded," leaving only the access terminals having the better signal conditions in the subset. Here, the number of access terminals placed in the subset may be determined based on a defined number of access terminals or a defined portion (e.g., percentage) of the reporting access terminals. For example, the subset may be limited to 20 access terminals or may be limited to 90% of the reporting access terminals.

As a specific example, the size of the subset may be specified based on a configurable number, Target_Affected_UEs, that indicates a tolerable number of affected access terminals for a transmit power update period. For example, a femto cell may be configured so that it is allowed to affect Target_Affected_UEs number of access terminals during a given update period. In other words, it is deemed acceptable for the interference caused by the femto cell at this number of macro access terminals to exceed a defined level of interference (e.g., which may correspond to a level of interference that disrupts macro reception at the macro access terminal). Hence, this quantity of the most affected access terminals is "excluded" from the set of reporting access terminals, thereby leaving a subset of access terminals for which the femto cell's transmissions are not to cause interference. Accordingly, if the number of access terminals in the subset is greater than zero, the femto cell needs to ensure that its transmit power does not unduly interfere with the access terminals in the subset.

As represented by block 408, the access point controls its transmit power to achieve specified signal conditions at the subset of access terminals. For example, the femto cell may adjust its transmit power, as necessary, to cause an acceptable level of interference at the subset of access terminals. In some cases, the transmit power may be adjusted so that subsequently measured signal conditions (e.g., received macro cell signal strength) corresponding to signals that the subset of access terminals subsequently receive from the macro access point will be greater than or equal to a defined threshold. Conversely, in other cases, the transmit power may be adjusted so that subsequently measured signal conditions (e.g., received femto cell signal strength) corresponding to signals that the subset of access terminals subsequently receive from the femto cell will be less than or equal to a defined threshold.

As a specific example, the transmit power of the femto cell is calibrated so that the access terminal having the worst signal conditions of the subset of access terminals (e.g., the access terminal having the lowest number ranking in the subset) sees a macro signal strength that is greater than or equal to a defined threshold. Here, the femto cell may calculate this transmit power value since the femto cell may determine the transmit power of the macro cell, the transmit power of the femto cell, the path loss between the access terminal and the macro cell, and the path loss between the access terminal and the femto cell.

As above, the newly calculated transmit power (Pnew) may be constrained by minimum and maximum transmit power limits (e.g., as specified for the access point and/or by another transmit power control algorithm).

Figure 5:
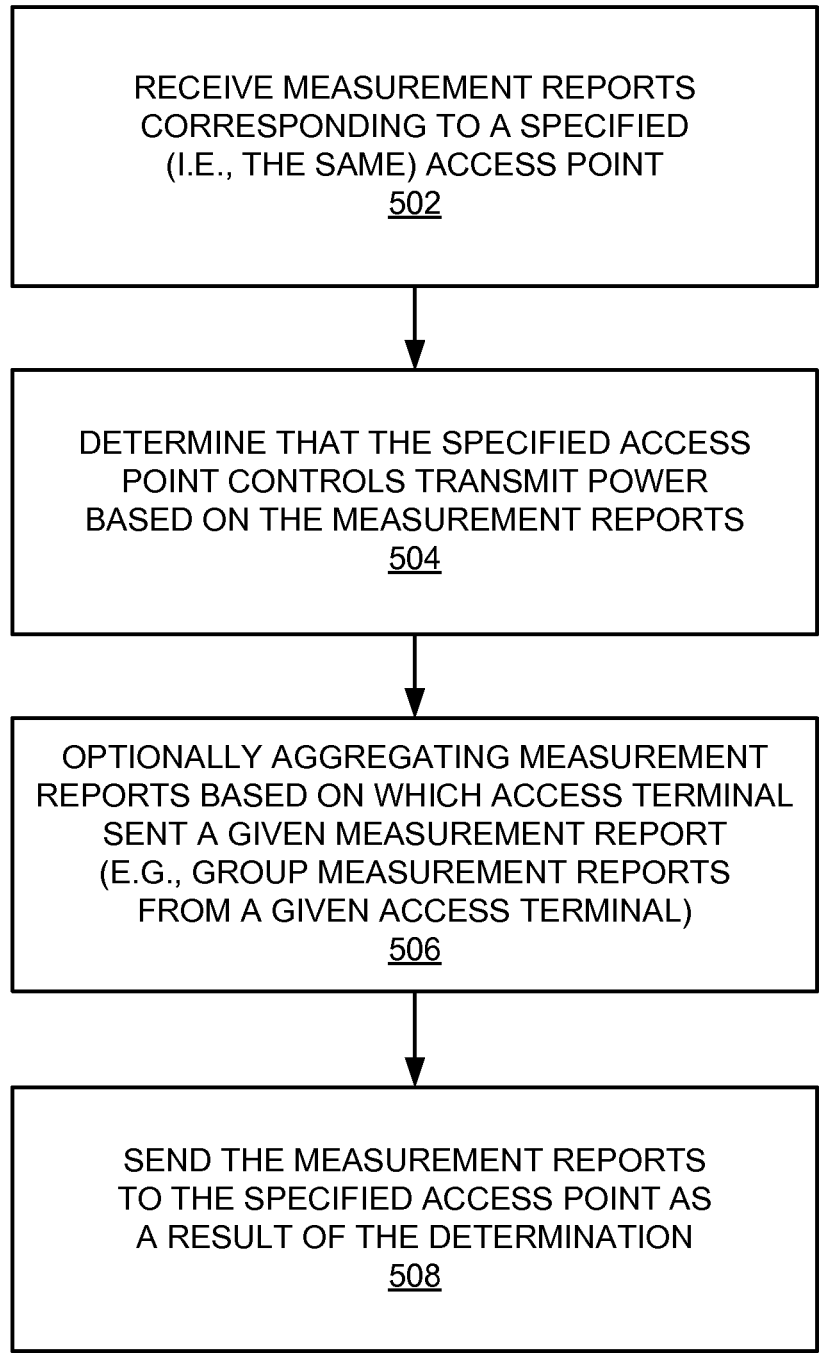
FIG. 5 is a flowchart of several sample aspects of operations that may be performed in conjunction with a handling measurement reports at a network entity.

FIG. 5 describes sample operations that may be performed at a network entity to handle measurement report-related messaging in conjunction with the transmit power control techniques described herein. As discussed herein, the network entity may take various forms including, for example, a radio network controller, a femto management server, or an access point (e.g., a macro access point or a femto access point).

As represented by block 502, at various points in time, the network entity receives measurement reports that originate from one or more access terminals. For example, a core network entity (e.g., a radio network controller) may receive measurement report-related messages from different access points managed by that network entity. As another example, an access point may receive measurement reports from various access terminals served by that access point.

As discussed herein, the measurement reports generated by a given access terminal typically include measurement information for several access points. Thus, a network entity will receive measurement reports directed to different access points. Accordingly, to facilitate transmit power calibration at a specific access point in accordance with the teachings herein, the network entity identifies those measurement reports corresponding to the specified (i.e., the same) access point.

As represented by block 504, the network entity determines whether the specified access point controls transmit power based on measurement reports. For example, if the access point does not control transmit power in this manner, the network entity may simply use the measurement reports for conventional handover-related operations rather than transmit power calibration (e.g., interference management). Conversely, if the network entity determines that the access point does control transmit power based on measurement reports from non-served access terminals, the network entity takes appropriate action to send this information to the access point.

As represented by block 506, as discussed herein, the network entity may aggregate received measurement reports based on which access terminal sent a given measurement report. That is, the network entity may group all of the measurement reports from a given access terminal together.

As represented by block 508, the access point sends the measurement reports to the specified access point as a result of the determination (at block 504) that the access point controls transmit power based on measurement reports. The measurement reports may be sent in different ways in different implementations. In some cases, the network entity simply sends the measurement reports upon receipt (e.g., the network entity does not aggregate the measurement reports or schedule their delivery at pre-designated times). In other cases, the network entity aggregates the measurement reports (e.g., as discussed herein) and sends the measurement reports in corresponding groups. In these cases, each measurement report group may be sent along with an indication that identifies the access terminal from which the measurement reports originated. Also, in some cases (e.g., in the case of aggregation), the network entity schedules the sending of the measurement report-based messages. For example, the messages may be sent periodically, once every transmit power update period.

The sending of the measurement reports may be initiated in various ways. In some cases, the network entity sends the measurement reports on a periodic basis. In some cases, the sending of the measurement reports by the network entity is triggered by a request from the specified access point.

The network entity may uniquely identify the destination access point for the measurement report messages in various ways. In some implementations access terminals include a unique identifier (e.g., a cell identifier) of the access point in the measurement report. For example, the access terminal may acquire this identifier from a broadcast signal transmitted by the access point. In some implementations, the unique identity of an access point is determined based on different timing information used by different access points in a network. Other access point identity disambiguation techniques may be employed in other cases.

Figure 6:
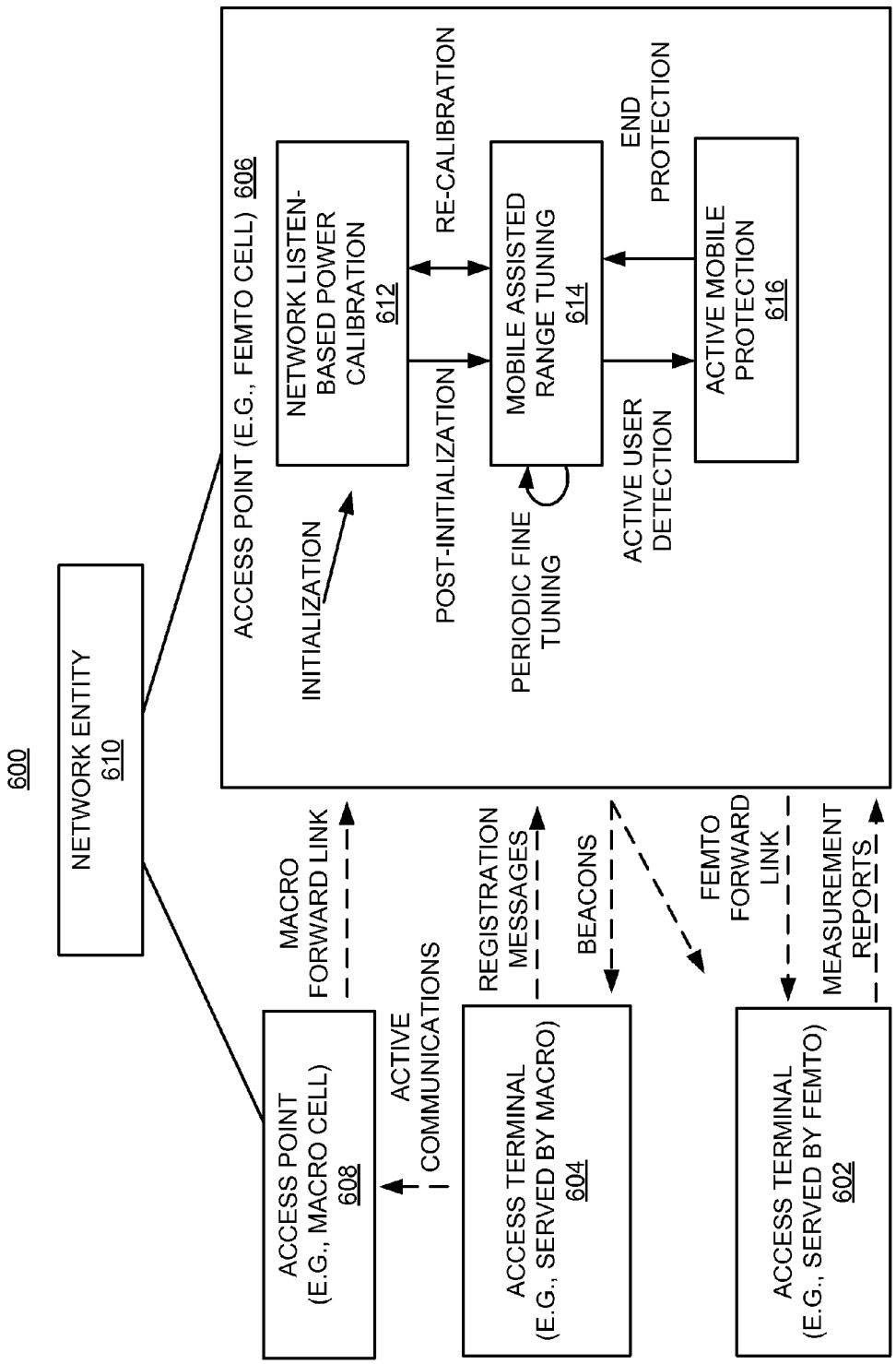
FIG. 6 is a simplified block diagram of several sample aspects of a communication system wherein an access point uses a multi-stage power control scheme to control transmit power.

Referring now to the system 600 of FIG. 6, in some implementations the above-described measurement report transmit power schemes may be employed in a multi-stage transmit power control scheme. For example, the access point 606 may jointly employ network listen-based power calibration (NLPC) functionality as represented by the block 612, mobile assisted range tuning (MART) functionality as represented by the block 614, and active mobile protection functionality as represented by the block 616. At any given point in time, transmit power is controlled (e.g., calibrated) depending on the state of the access point 606.

In a sample implementation, these states may comprise an initialization (e.g., power-up or recalibration) state, a post-initialization state, and a state relating to the detection of the presence of an active macro user in the vicinity of the access point 606. For example, when the access point 606 is powered-up, the access point 606 initially uses NLPC.

Subsequently, the access point 606 uses mobile (i.e., access terminal) assisted range tuning For example, the access point 606 may switch to the MART state after it collects a sufficient amount of information from nearby access terminals. This information may be collected in different ways and may take different forms. For example, at various points in time, the access point 606 will transmit information on its service channel and may also transmit on one or more beacon channels. As a result of these transmissions, the access point 606 may receive messages from nearby access terminals.

In some cases, MART is based on measurement report messages generated by a nearby access terminal (e.g., the access terminal 604) that is not currently being served by the access point 606. Here, the access terminal 604 may send measurement report messages to its serving access point (e.g., the access point 608), after which the messages are forwarded to the non-serving access point 606 (e.g., via the backhaul) and used for power control as described above at FIGS. 1-4.

In some cases, MART is based on measurement report messages generated by a nearby access terminal (e.g., the access terminal 602) that is authorized to obtain active mode service via the access point 606. In this case, the access terminal 602 sends the measurement report messages directly to the access point 606. These measurement report messages may report the channel quality (e.g., in terms of signal power) measured at the access terminal 602 for the femto forward link service channel and/or the beacon channel(s). In some cases, the access point 606 may request the access terminal to measure channel quality on the femto service channel and/or the beacon channel(s) and report this information back using measurement report messages. Additionally, in some cases, the access point 606 may request the access terminal to report path loss on the femto service channel and/or the beacon channel and report this information back using measurement report messages.

In some cases, MART is based on registration messages received from a nearby access terminal (e.g., the access terminal 604) that is not authorized to receive active mode service from the access point 606. Here, the access terminal 604 may be served by another access point (e.g., the access point 608) or may be in idle mode. The access terminal 604 may attempt to register with the access point 606 as a result of receiving forward link signals, pilots, or beacons from the access point 606. Consequently, the access terminal 604 will send registration messages to the access point 606. However, since the access terminal is not allowed to access active mode service via the access point 606, this registration request will fail. As discussed in more detail below, as a result of receiving these registration messages, the access point 606 may determine how to best adjust its transmit power to provide an acceptable tradeoff between providing adequate coverage and minimizing interference to such non-allowed access terminals. In some cases, the access point 606 may request that one or more of signal power, quality or path loss to be reported as a part of a registration message from the access terminal 604.

In the MART state, the access point 606 may continually (e.g., periodically) update the transmit power. For example, the access point 606 may acquire information from nearby access terminals (e.g., channel quality, received power, and path loss reports from non-served access terminal and/or home access terminal, and registration statistics) and then fine tune the transmit power on a periodic basis (e.g., according to the update period discussed above) based on this information.

In addition, while in the MART state, the access point 606 may regularly monitor network conditions to determine whether there has been a significant change in network conditions (e.g., due to a change in femto cell location and/or installation/removal of access points in the vicinity). If so, the access point 606 may switch back to the network listen-based power calibration state to update one or more power control parameters (e.g., transmit power limits). For example, a femto cell may periodically perform network listen measurements and performs recalibration if the RF environment has changed. A change in the RF environment may be detected (e.g., a change in channel conditions identified) by comparing previous network listen measurements (e.g., previously received pilot signals) with the new network listen measurements (e.g., newly received pilot signals). If a change is detected, transmit power may be re-calibrated (e.g., by setting at least one transmit power limit based on the identified channel conditions). In some cases, this may involve combining network listen measurements with previously learned information from received messages. The periodicity of making network listen measurements for recalibration may be smaller than the MART periodicity. Also, recalibration is done under events such as when the access points is re-powered up, when the RF environment has changed, or when the access point is explicitly directed to re-calibrate by the network.

Also, while in the NLPC state or the MART state, the access point 606 may regularly (e.g., continually) monitor for the presence of any nearby active users. For example, a femto cell may periodically switch to an active mobile protection (AMP) state to monitor for nearby active macro users by measuring out-of-cell interference on one or more reverse link frequencies. In the event a nearby active user is detected on a given carrier frequency, the access point 606 switches to the active mobile protection state. Here, the access point 606 may temporarily limit its transmissions by, for example, reducing transmit power or ceasing transmission on that carrier frequency. Then, upon determining that the user is no longer nearby or is no longer active, the access point 606 returns to the previous state (e.g., NLPC or MART).

From the above, it should be appreciated that while in the NLPC state, the access point 606 may transmit using transmit power parameters determined by an NLPC algorithm. Conversely, while in the MART state, the access point 606 may transmit using transmit power parameters determined by one or more MART algorithms, whereby the transmit power parameters are determined based on messages received from at least one access terminal (e.g., a home access terminal and/or an alien access terminal). In the MART state, the access point 606 will continue collecting messages from the at least access terminal. In addition, for active mobile protection, the access point 606 may regularly monitor for other access terminals (e.g., active macro access terminals) that may be subject to interference from the access point 606.

The transmit power schemes (e.g., NLPC, MART, AMP) may interact in different ways in different implementations. In some cases, different transmit power schemes may be used in succession to control transmit power during different states. For example, as discussed above, NLPC may be employed at initialization. NLPC may then be superseded by MART which, in turn, is occasionally superseded by AMP. In other cases, one transmit power scheme may provide one or more parameters used by another scheme. For example, NLPC may be used to provide a set of minimum and maximum transmit power limits that are subsequently used by a non-served access terminal measurement report-based MART algorithm or a registration message-based MART algorithm. As another example, a home access terminal (HAT) report-based MART algorithm may be used to provide a set of minimum and maximum transmit power limits that are subsequently used by a non-served access terminal measurement report-based MART algorithm or a registration message-based MART algorithm.

Figure 7:
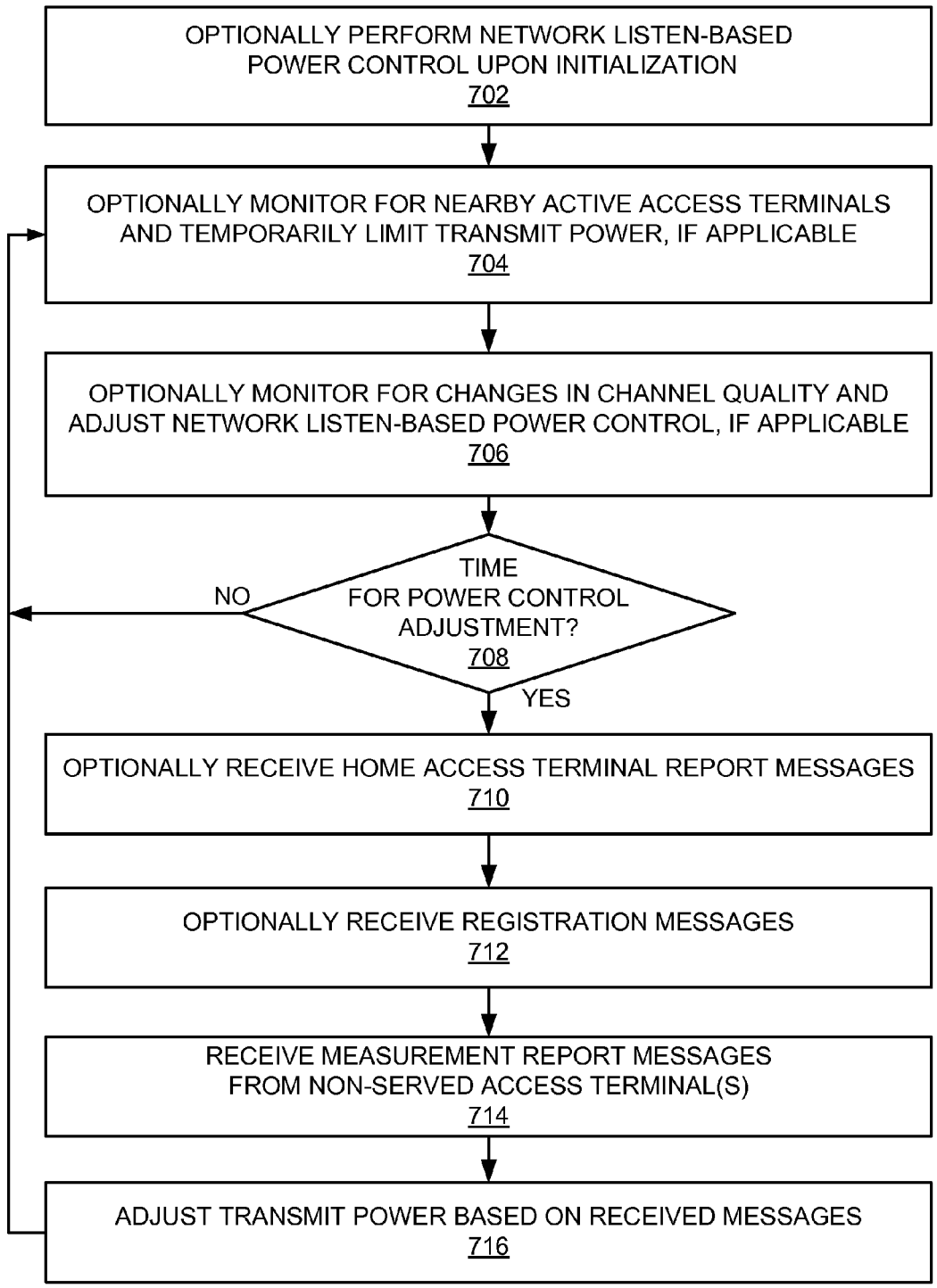
FIG. 7 is a flowchart of several sample aspects of operations that may be performed in conjunction with a multi-stage transmit power control scheme.

FIG. 7 illustrates sample operations that may be performed on conjunction with a multi-state transmit power control scheme. As indicated in the flowchart, one or more of NLPC, AMP, HAT report-based MART, or registration message-based MART may optionally be employed in a given implementation in conjunction with the non-served access terminal report-bases algorithms taught herein.

As represented by block 702, an access point (e.g., a femto cell) may be powered-up, reset, or subjected to some other procedure that commences initialization of the access point. The access point then employs network listen-based power calibration (NLPC) after initialization is commenced. In some aspects, this involves monitoring one or more channels (e.g., on a corresponding carrier frequency) to determine the corresponding channel quality (e.g., received signal strength) as seen by the access point. An access point may perform this monitoring using a network listen module (NLM) or other suitable component(s). Based on the determined channel quality, the access point sets the initial transmit power to be used by the access point. This initial transmit power may comprise, for example, an initial value to be used for the transmit power or an initial range (e.g., specified by minimum and maximum limits) within which the transmit power is to be limited.

In so-called co-channel deployments, a femto cell is deployed on the same carrier frequency as a macro cell. That is, the femto cell's forward link (also referred to as the downlink) is on the same carrier frequency as the macro cell's forward link. In this case, the femto cell may use NLPC to control transmit power on this carrier frequency to mitigate any interference the femto cell's transmissions may have on nearby access terminals (e.g., macro access terminals) operating on this frequency.

Here, the femto cell's forward link transmit power may be calibrated by measuring the surrounding macro cells' forward link channel quality (e.g., RSSI, CPICH Ec/Io, RSCP). The femto cell uses the macro cell RSSI measurements and a defined coverage radius (as an input) to set the initial transmit power. The transmit power is chosen to satisfy an idle reselection requirement. For example, the femto cell CPICH Ec/Io should be better than Qqualmin for the femto cell at the edge of the coverage radius (or at a given path loss). To achieve this, the transmit power level is chosen as a function of the measured macro quality (CPICH/Io) and a path loss value. Furthermore, to limit interference induced at nearby access terminals (e.g., macro access terminals), another potential requirement is for the femto cell transmission to increase Io by at most a certain fixed amount at the edge of the femto cell coverage range (or at a given path loss). The femto cell transmit power is then chosen to be the minimum of these two criteria. Again, this allows the femto cell to adapt its transmit power based on its location in the macro network. The transmit power is set lower at a location where macro cell RSSI is weak as compared to a location where macro cell RSSI is strong.

As represented by block 704, an access point also may employ active mobile protection in some implementations. For example, a femto cell's forward link transmissions may degrade the voice call quality of active macro users in the vicinity of the femto cell. To protect these active macro mobiles from such interference, whenever the presence of a nearby active macro user is detected, the femto cell temporarily throttles (i.e., restricts) its forward link transmissions.

Accordingly, an access point may regularly (e.g., continuously) monitor for the presence of nearby active non-home access terminals (e.g., active macro access terminals) and take action to restrict the access point's transmissions until that access terminal leaves the vicinity or ends the active communication. Once there are no longer any such active access terminals in the vicinity of the access point, the access point may resume using the transmit power level dictated by the other transmit power algorithms (e.g., NLPC or MART).

An access point may restrict its transmission in various ways. For example, the access point may temporarily reduce its transmit power, temporarily reduce the periodicity of its transmissions, or temporarily cease transmission. The access point may restrict its transmission for a defined period of time or the access point may restrict its transmission until a terminating event occurs. For example, in cases where detection of an access terminal is based on a measured received signal strength exceeding a threshold, the access point may terminate the restriction of transmission when measured received signal strength falls below a certain configurable threshold. In any of these cases, upon terminating the restriction of transmission, the access point may resume transmitting at the transmit power level and/or periodicity that was used prior to the restriction of transmission.

An access point may detect the presence of an active access terminal in various ways. In some implementations, the femto cell detects the presence of a nearby macro cell user by measuring received signal strength on the macro cell reverse link carrier frequency that is (or frequencies that are) paired with a macro cell forward link carrier frequency (or frequencies). For example, the measurement of a reverse link RSSI value that exceeds a certain expected value (e.g., a threshold) over a period of time may serve as an indication of the presence of an active macro cell user that is receiving on the corresponding forward link frequency. In some implementations, the presence of a nearby active macro cell user may be known apriori to the access point. For example, in a case of active handover of an access terminal from a femto cell to a macro cell (commonly referred to as active hand-out) for a restricted user or guest user, the femto cell will know that this access terminal is in the vicinity of the femto cell and is now being served by the macro cell.

As represented by block 706, an access point may regularly (e.g., periodically) monitor for changes in channel quality to determine whether to temporarily revert back to NLPC. For example, if there has been a recent significant change in channel quality (e.g., due to a change in the location of the access point, and/or installation/removal of access points in the vicinity), the information collected for MART may be considered unreliable. In such a case, the access point may switch back to the NLPC state to reestablish initial transmit power limits for the access point until new MART information is acquired.

Thus, in addition to initial power setting upon initialization, the NLPC technique may be used for recalibration purposes to identify changes in the RF environment due to events such as a change in an access point's location and adjust the transmit power accordingly. Such recalibration may be initiated autonomously by the access point or directed by the network. Recalibration may also be initiated upon re-power-up or reset of the femto cell. After reset or re-power-up, the femto cell may first check for changes in channel quality. If no significant change is detected, the femto cell may use the transmit power that was used prior to the reset or re-power-up event. Otherwise, the femto cell may switch back to the NLPC state to reestablish initial transmit power levels.

As discussed above, NLPC has certain inherent limitations. Consequently as represented by block 708, MART may be used to periodically adjust the access point's transmit power. For example, after applying NLPC, MART may be performed regularly (e.g., every 24 hours, every couple of days, etc.) based on messages received at the access point as discussed herein. In this way, MART may be used to determine optimal long term transmit power levels for the access point.

As represented by block 710, in some implementations, MART is based on channel quality reports sent by home access terminals (HAT reports). In some aspects, adequate coverage for home access terminals may be ensured through the use of HAT reports. Based on HAT feedback, a femto cell may learn the desired coverage range (i.e., path loss at different locations in the building) and RF conditions in the building and then choose an optimal transmit power level. For example, a femto cell may transmit at a relatively higher power when deployed in a large building as compared to when deployed in a small building. In some implementations, a change in transmit power based on HAT reports may not be made until the access point has received a sufficient number (e.g., a defined number) of HAT reports.

As represented by block 712, in some implementations, MART is based on statistics of registrations performed by access terminals (e.g., preferred access terminals or non-home access terminals such as macro access terminals) that are in the femto cell's coverage. The registration statistics may correspond to, for example, the number of registrations attempts (e.g., failed registrations by alien access terminals) made at the access point over a defined period of time. In some aspects, a large number of registrations by alien access terminals is an indication of leakage outside the home. Therefore, when the number of registrations by alien access terminals is above a certain configurable threshold, transmit power and therefore the coverage range of the femto cell is reduced to control interference to alien access terminals.

As represented by block 714, in accordance with the teachings herein, MART may be based on measurement report messages received from non-served access terminals as discussed above at FIGS. 1-4.

As represented by block 716, the access point sets its transmit power based on the messages collected at one or more of blocks 710-714. By using information from these messages, the femto cell may choose a desired transmit power setting to balance the coverage versus interference minimization trade-off. For example, using received HAT reports, a femto cell may estimate the path loss to a home access terminal at different locations in a building as well as the macro channel quality (and/or received signal power) at these locations. The femto cell may thus learn the required coverage range and RF conditions in the building and fine tune its transmit power accordingly. As a result, the femto cell may automatically transmit at a relatively higher power when deployed in a large building as compared to when it is deployed in a small building.

As a restriction on this transmit power determination, however, the femto cell may use registration statistics and/or non-served measurement reports to mitigate interference to nearby non-served access terminals. For example, the transmit power may be scaled back from the HAT report-based transmit power value based on whether: a large number of registration messages are received, a large number of event triggered measurement reports are received, more than the tolerable number of access terminals are subjected to interference, or based on some combination of these factors.

The transmit power control schemes described herein may be implemented in a variety of ways in different implementations. For example, the teachings herein may be employed to control transmit power on various types of channels.

In addition, an access point may acquire measurement report information in various ways. For example, in some implementations an access point may acquire this information by monitoring the forward link of nearby access terminals.

FIG. 8 illustrates several sample components (represented by corresponding blocks) that may be incorporated into nodes such as an access point 802 (e.g., corresponding to the access point 106 or the access point 606) and a network entity 804 (e.g., corresponding to the network entity 110 or an access point as discussed above) to perform transmit power control-related operations as taught herein. The described components also may be incorporated into other nodes in a communication system. For example, other nodes in a system may include components similar to those described for the access point 802 and the network entity 804 to provide similar functionality. Also, a given node may contain one or more of the described components. For example, an access point may contain multiple transceiver components that enable the access point to operate on multiple carriers and/or communicate via different technologies.

As shown in FIG. 8, the access point 802 includes a transceiver 806 for communicating with other nodes. The transceiver 806 includes a transmitter 808 for sending signals (e.g., data, beacons, messages) on one or more carrier frequencies and a receiver 810 for receiving signals (e.g., messages, registration messages, pilot signals, measurement reports) on one or more carrier frequencies. In implementations where the network entity 804 supports wireless communication (e.g., where the network entity comprises an access point), the network entity 804 also includes a transceiver 812 comprising a transmitter 814 and a receiver 816 for communicating with other nodes.

The access point 802 and the network entity 804 also include network interfaces 818 and 820, respectively, for communicating with other nodes (e.g., network entities). For example, the network interfaces 818 and 820 may be configured to communicate with one or more network entities via a wire-based or wireless backhaul. In some aspects, the network interfaces 818 and 820 may be implemented as a transceiver (e.g., including transmitter and receiver components) configured to support wire-based or wireless communication. Accordingly, in the example of FIG. 8, the network interface 818 is shown as including a transmitter 822 and a receiver 824 for sending and receiving messages (e.g., measurement reports), while the network interface 820 is shown as including a transmitter 826 and a receiver 828 for sending and receiving messages (e.g., measurement reports).

The access point 802 and the network entity 804 include other components that may be used in conjunction with transmit control-related operations as taught herein. For example, the access point 802 includes a transmit power controller 830 for controlling transmit power of the access point 802 (e.g., identifying a quantity of messages, comparing the quantity to a threshold, controlling transmit power based on the comparison, determining that an access terminal is actively receiving information, restricting transmission, identifying channel conditions, setting at least one limit for transmit power, ranking access terminals, designating a subset of the access terminals, controlling transmit power to achieve specified signal conditions at the subset of access terminals) and for providing other related functionality as taught herein. In some implementations, some of the functionality of the transmit power controller 830 may be implemented in the receiver 810 and/or the transmitter 808. The network entity 804 includes a measurement report controller 832 for handling measurement report-related messaging (e.g., determining that an access point controls transmit power based on measurement reports, aggregating measurement reports) and for providing other related functionality as taught herein. The access point 802 and the network entity 804 also may include communication controllers 834 and 836, respectively, for controlling communications (e.g., sending and receiving messages) and for providing other related functionality as taught herein. Also, the access point 802 and the network entity 804 include memory components 838 and 840 (e.g., each including a memory device), respectively, for maintaining information (e.g., received message information).

For convenience, the access point 802 and the network entity 804 are shown in FIG. 8 as including components that may be used in the various examples described herein. In practice, the functionality of one or more of these blocks may be different in different embodiments. For example, the functionality of block 830 may be different in a deployment implemented according to FIG. 3 as compared to a deployment implemented according to FIG. 4.

The components of FIG. 8 may be implemented in various ways. In some implementations the components of FIG. 8 may be implemented in one or more circuits such as, for example, one or more processors and/or one or more ASICs (which may include one or more processors). Here, each circuit (e.g., processor) may use and/or incorporate data memory for storing information or executable code used by the circuit to provide this functionality. For example, some of the functionality represented by blocks 806 and 818, and some or all of the functionality represented by blocks 830, 834, and 838 may be implemented by a processor or processors of an access point and data memory of the access point (e.g., by execution of appropriate code and/or by appropriate configuration of processor components). Similarly, some of the functionality represented by blocks 812 and 820, and some or all of the functionality represented by blocks 832, 836, and 840 may be implemented by a processor or processors of a network entity and data memory of the network entity (e.g., by execution of appropriate code and/or by appropriate configuration of processor components).

As discussed above, in some aspects the teachings herein may be employed in a network that includes macro scale coverage (e.g., a large area cellular network such as a 3G network, typically referred to as a macro cell network or a WAN) and smaller scale coverage (e.g., a residence-based or building-based network environment, typically referred to as a LAN). As an access terminal (AT) moves through such a network, the access terminal may be served in certain locations by access points that provide macro coverage while the access terminal may be served at other locations by access points that provide smaller scale coverage. In some aspects, the smaller coverage nodes may be used to provide incremental capacity growth, in-building coverage, and different services (e.g., for a more robust user experience).

In the description herein, a node (e.g., an access point) that provides coverage over a relatively large area may be referred to as a macro access point while a node that provides coverage over a relatively small area (e.g., a residence) may be referred to as a femto access point. It should be appreciated that the teachings herein may be applicable to nodes associated with other types of coverage areas. For example, a pico access point may provide coverage (e.g., coverage within a commercial building) over an area that is smaller than a macro area and larger than a femto area. In various applications, other terminology may be used to reference a macro access point, a femto access point, or other access point-type nodes. For example, a macro access point may be configured or referred to as an access node, base station, access point, eNodeB, macro cell, and so on. Also, a femto access point may be configured or referred to as a Home NodeB, Home eNodeB, access point base station, femto cell, and so on. In some implementations, a node may be associated with (e.g., referred to as or divided into) one or more cells or sectors. A cell or sector associated with a macro access point, a femto access point, or a pico access point may be referred to as a macro cell, a femto cell, or a pico cell, respectively.

Figure 9:
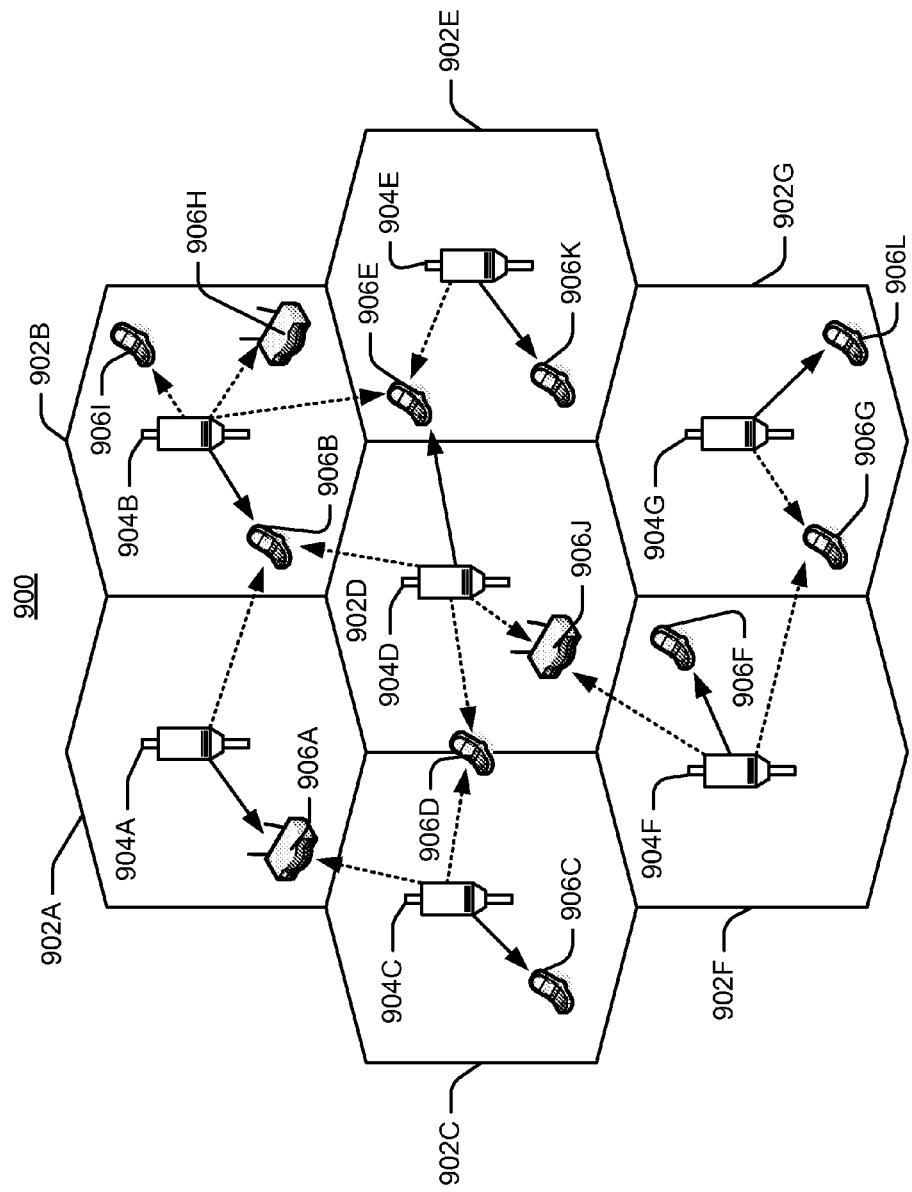
FIG. 9 is a simplified diagram of a wireless communication system.

FIG. 9 illustrates a wireless communication system 900, configured to support a number of users, in which the teachings herein may be implemented. The system 900 provides communication for multiple cells 902, such as, for example, macro cells 902A-902G, with each cell being serviced by a corresponding access point 904 (e.g., access points 904A-904G). As shown in FIG. 9, access terminals 906 (e.g., access terminals 906A-906L) may be dispersed at various locations throughout the system over time. Each access terminal 906 may communicate with one or more access points 904 on a forward link (FL) and/or a reverse link (RL) at a given moment, depending upon whether the access terminal 906 is active and whether it is in soft handoff, for example. The wireless communication system 900 may provide service over a large geographic region. For example, macro cells 902A-902G may cover a few blocks in a neighborhood or several miles in a rural environment.

Figure 10:
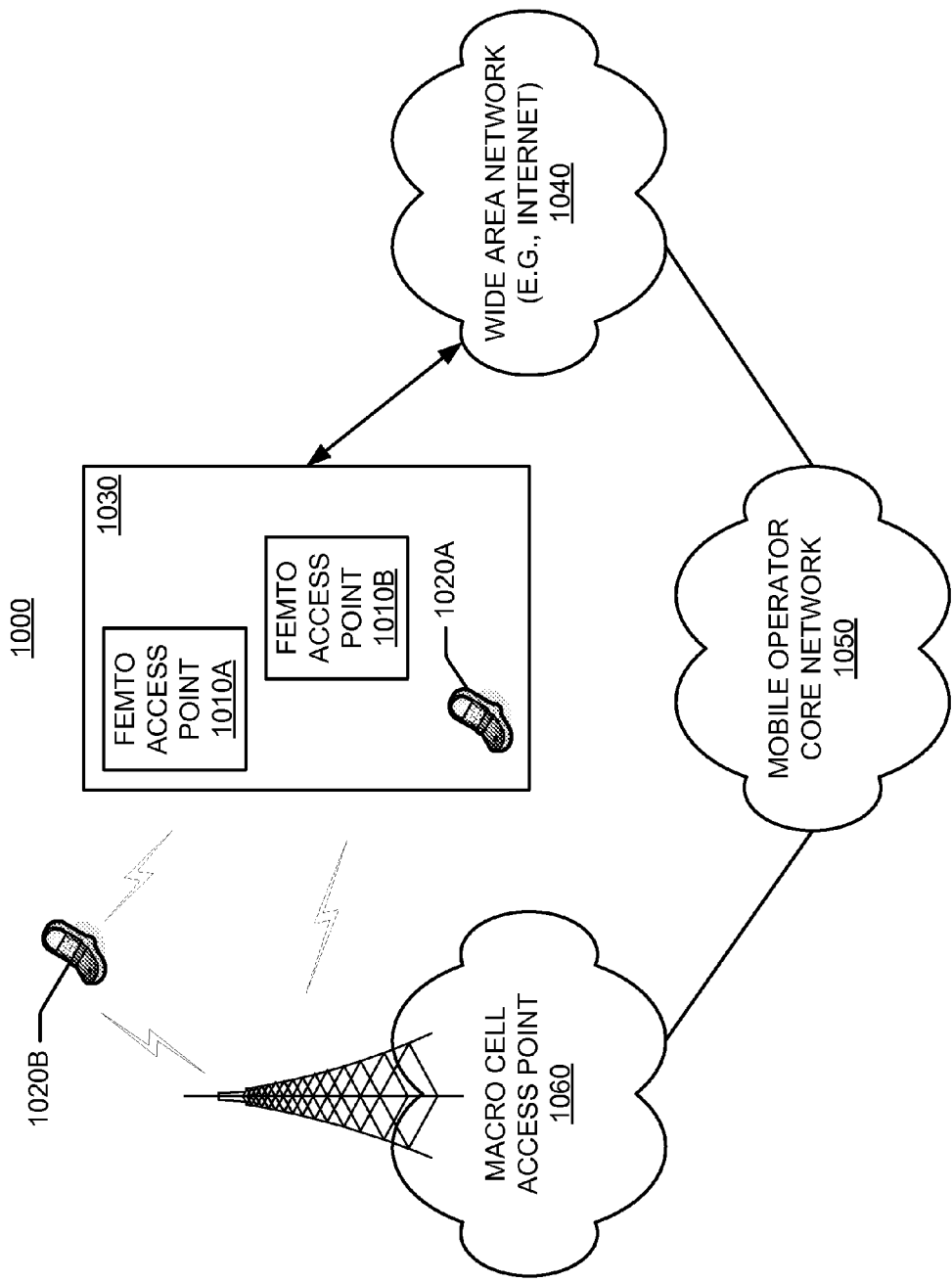
FIG. 10 is a simplified diagram of a wireless communication system including femto nodes.

FIG. 10 illustrates an exemplary communication system 1000 where one or more femto access points are deployed within a network environment. Specifically, the system 1000 includes multiple femto access points 1010 (e.g., femto access points 1010A and 1010B) installed in a relatively small scale network environment (e.g., in one or more user residences 1030). Each femto access point 1010 may be coupled to a wide area network 1040 (e.g., the Internet) and a mobile operator core network 1050 via a DSL router, a cable modem, a wireless link, or other connectivity means (not shown). As will be discussed below, each femto access point 1010 may be configured to serve associated access terminals 1020 (e.g., access terminal 1020A) and, optionally, other (e.g., hybrid or alien) access terminals 1020 (e.g., access terminal 1020B). In other words, access to femto access points 1010 may be restricted whereby a given access terminal 1020 may be served by a set of designated (e.g., home) femto access point(s) 1010 but may not be served by any non-designated femto access points 1010 (e.g., a neighbor's femto access point 1010).

Figure 11:
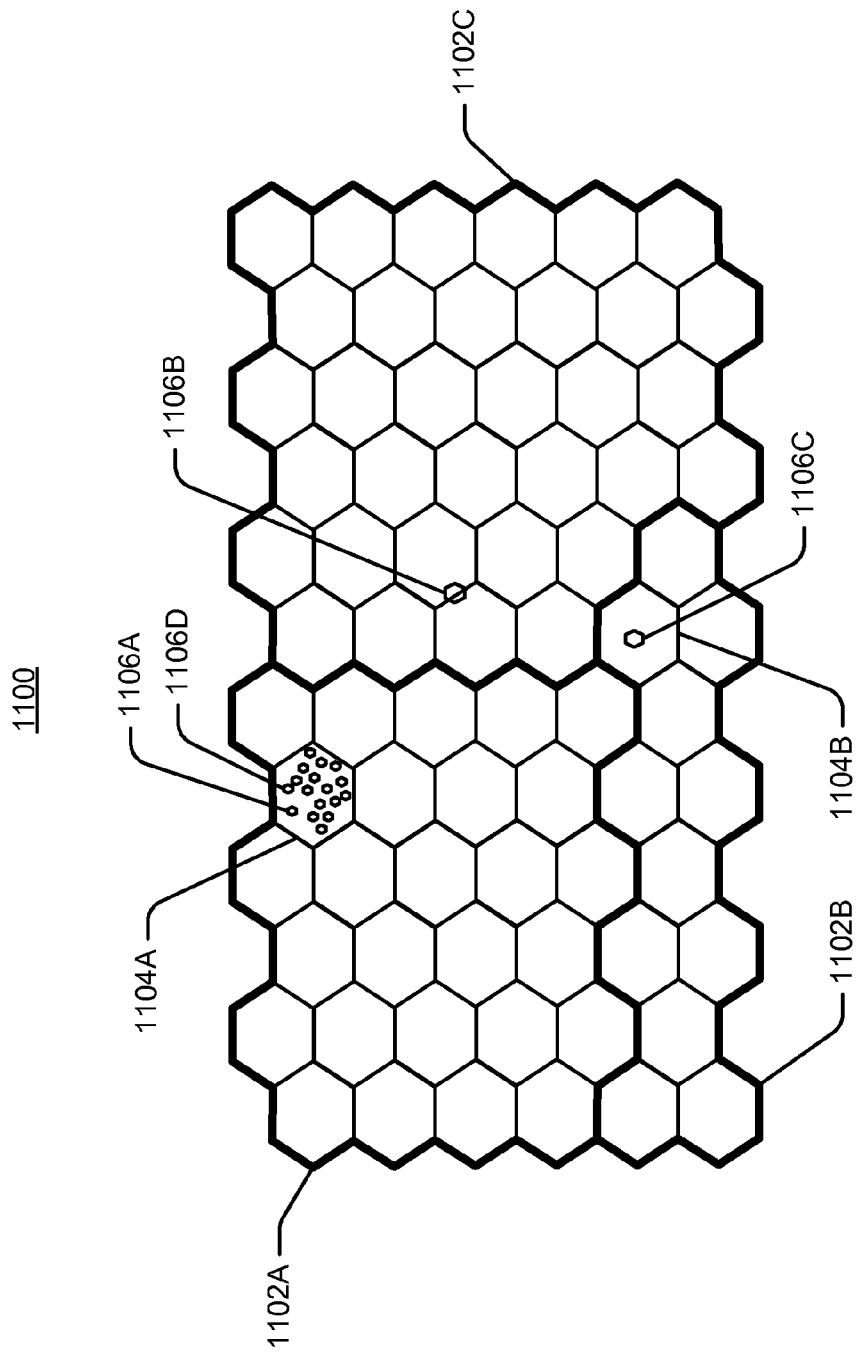
FIG. 11 is a simplified diagram illustrating coverage areas for wireless communication.

FIG. 11 illustrates an example of a coverage map 1100 where several tracking areas 1102 (or routing areas or location areas) are defined, each of which includes several macro coverage areas 1104. Here, areas of coverage associated with tracking areas 1102A, 1102B, and 1102C are delineated by the wide lines and the macro coverage areas 1104 are represented by the larger hexagons. The tracking areas 1102 also include femto coverage areas 1106. In this example, each of the femto coverage areas 1106 (e.g., femto coverage areas 1106B and 1106C) is depicted within one or more macro coverage areas 1104 (e.g., macro coverage areas 1104A and 1104B). It should be appreciated, however, that some or all of a femto coverage area 1106 may not lie within a macro coverage area 1104. In practice, a large number of femto coverage areas 1106 (e.g., femto coverage areas 1106A and 1106D) may be defined within a given tracking area 1102 or macro coverage area 1104. Also, one or more pico coverage areas (not shown) may be defined within a given tracking area 1102 or macro coverage area 1104.

Referring again to FIG. 10, the owner of a femto access point 1010 may subscribe to mobile service, such as, for example, 3G mobile service, offered through the mobile operator core network 1050. In addition, an access terminal 1020 may be capable of operating both in macro environments and in smaller scale (e.g., residential) network environments. In other words, depending on the current location of the access terminal 1020, the access terminal 1020 may be served by a macro cell access point 1060 associated with the mobile operator core network 1050 or by any one of a set of femto access points 1010 (e.g., the femto access points 1010A and 1010B that reside within a corresponding user residence 1030). For example, when a subscriber is outside his home, he is served by a standard macro access point (e.g., access point 1060) and when the subscriber is at home, he is served by a femto access point (e.g., access point 1010A). Here, a femto access point 1010 may be backward compatible with legacy access terminals 1020.

A femto access point 1010 may be deployed on a single frequency or, in the alternative, on multiple frequencies. Depending on the particular configuration, the single frequency or one or more of the multiple frequencies may overlap with one or more frequencies used by a macro access point (e.g., access point 1060).

In some aspects, an access terminal 1020 may be configured to connect to a preferred femto access point (e.g., the home femto access point of the access terminal 1020) whenever such connectivity is possible. For example, whenever the access terminal 1020A is within the user's residence 1030, it may be desired that the access terminal 1020A communicate only with the home femto access point 1010A or 1010B.

In some aspects, if the access terminal 1020 operates within the macro cellular network 1050 but is not residing on its most preferred network (e.g., as defined in a preferred roaming list), the access terminal 1020 may continue to search for the most preferred network (e.g., the preferred femto access point 1010) using a better system reselection (BSR) procedure, which may involve a periodic scanning of available systems to determine whether better systems are currently available and subsequently acquire such preferred systems. The access terminal 1020 may limit the search for specific band and channel. For example, one or more femto channels may be defined whereby all femto access points (or all restricted femto access points) in a region operate on the femto channel(s). The search for the most preferred system may be repeated periodically. Upon discovery of a preferred femto access point 1010, the access terminal 1020 selects the femto access point 1010 and registers on it for use when within its coverage area.

Access to a femto access point may be restricted in some aspects. For example, a given femto access point may only provide certain services to certain access terminals. In deployments with so-called restricted (or closed) access, a given access terminal may only be served by the macro cell mobile network and a defined set of femto access points (e.g., the femto access points 1010 that reside within the corresponding user residence 1030). In some implementations, an access point may be restricted to not provide, for at least one node (e.g., access terminal), at least one of: signaling, data access, registration, paging, or service.

In some aspects, a restricted femto access point (which may also be referred to as a Closed Subscriber Group Home NodeB) is one that provides service to a restricted provisioned set of access terminals. This set may be temporarily or permanently extended as necessary. In some aspects, a Closed Subscriber Group (CSG) may be defined as the set of access points (e.g., femto access points) that share a common access control list of access terminals.

Various relationships may thus exist between a given femto access point and a given access terminal. For example, from the perspective of an access terminal, an open femto access point may refer to a femto access point with unrestricted access (e.g., the femto access point allows access to any access terminal). A restricted femto access point may refer to a femto access point that is restricted in some manner (e.g., restricted for access and/or registration). A home femto access point may refer to a femto access point on which the access terminal is authorized to access and operate on (e.g., permanent access is provided for a defined set of one or more access terminals). A hybrid (or guest) femto access point may refer to a femto access point on which different access terminals are provided different levels of service (e.g., some access terminals may be allowed partial and/or temporary access while other access terminals may be allowed full access). An alien femto access point may refer to a femto access point on which the access terminal is not authorized to access or operate on, except for perhaps emergency situations (e.g., 911 calls).

From a restricted femto access point perspective, a home access terminal may refer to an access terminal that is authorized to access the restricted femto access point installed in the residence of that access terminal's owner (usually the home access terminal has permanent access to that femto access point). A guest access terminal may refer to an access terminal with temporary access to the restricted femto access point (e.g., limited based on deadline, time of use, bytes, connection count, or some other criterion or criteria). An alien access terminal may refer to an access terminal that does not have permission to access the restricted femto access point, except for perhaps emergency situations, for example, such as 911 calls (e.g., an access terminal that does not have the credentials or permission to register with the restricted femto access point).

For convenience, the disclosure herein describes various functionality in the context of a femto access point. It should be appreciated, however, that a pico access point may provide the same or similar functionality for a larger coverage area. For example, a pico access point may be restricted, a home pico access point may be defined for a given access terminal, and so on.

The teachings herein may be employed in a wireless multiple-access communication system that simultaneously supports communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 12:
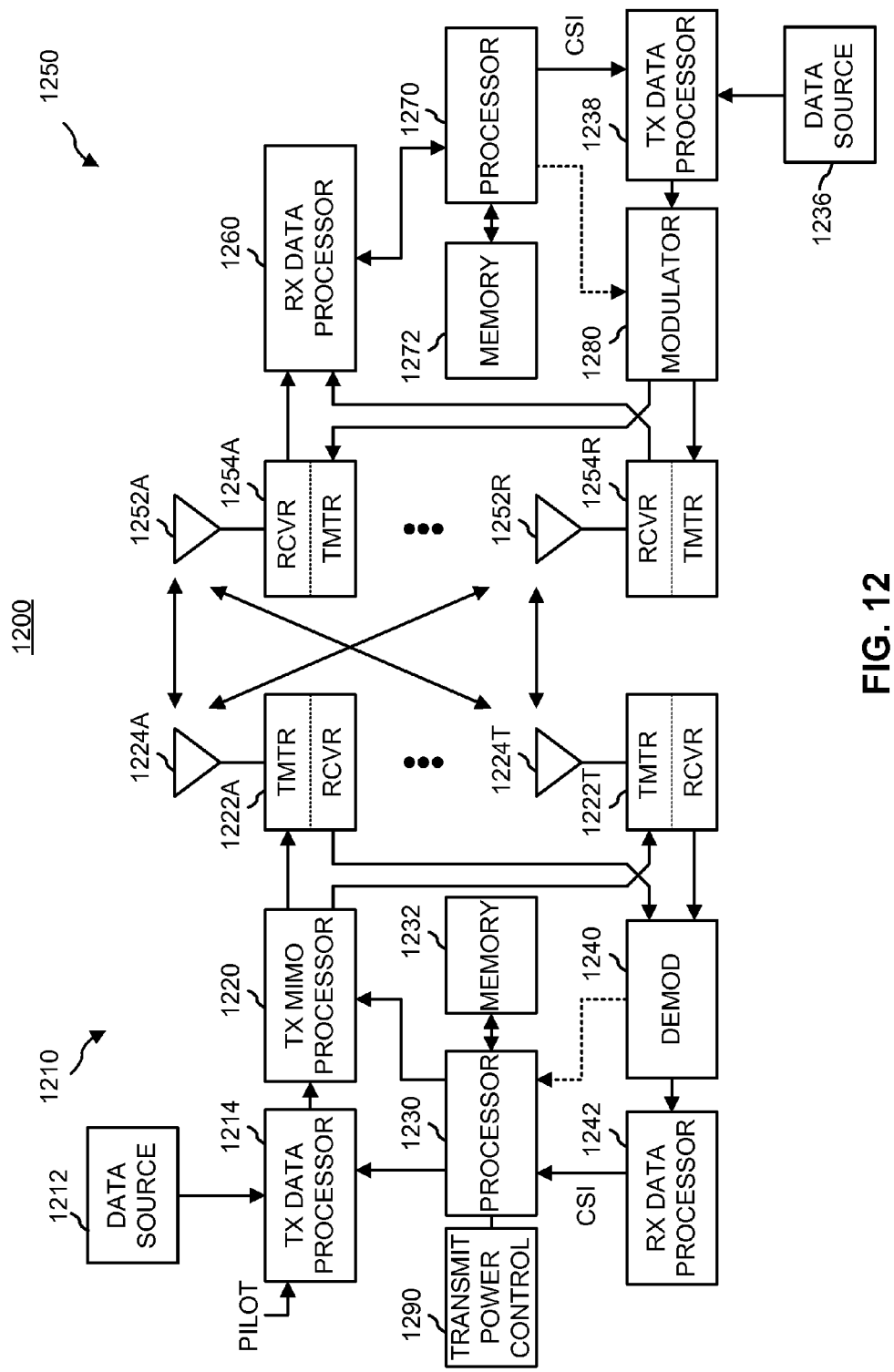
FIG. 12 is a simplified block diagram of several sample aspects of communication components.

FIG. 12 illustrates a wireless device 1210 (e.g., an access point) and a wireless device 1250 (e.g., an access terminal) of a sample MIMO system 1200. At the device 1210, traffic data for a number of data streams is provided from a data source 1212 to a transmit (TX) data processor 1214. Each data stream may then be transmitted over a respective transmit antenna.

The TX data processor 1214 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1230. A data memory 1232 may store program code, data, and other information used by the processor 1230 or other components of the device 1210.

The modulation symbols for all data streams are then provided to a TX MIMO processor 1220, which may further process the modulation symbols (e.g., for OFDM). The TX MIMO processor 1220 then provides $N_T$ modulation symbol streams to $N_T$ transceivers (XCVR) 1222A through 1222T. In some aspects, the TX MIMO processor 1220 applies beam-forming weights to the symbols of the data streams and to the antenna from which the symbol is being transmitted.

Each transceiver 1222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1222A through 1222T are then transmitted from $N_T$ antennas 1224A through 1224T, respectively.

At the device 1250, the transmitted modulated signals are received by $N_R$ antennas 1252A through 1252R and the received signal from each antenna 1252 is provided to a respective transceiver (XCVR) 1254A through 1254R. Each transceiver 1254 conditions (e.g., filters, amplifies, and downconverts) a respective received signal, digitizes the conditioned signal to provide samples, and further processes the samples to provide a corresponding "received" symbol stream.

A receive (RX) data processor 1260 then receives and processes the $N_R$ received symbol streams from $N_R$ transceivers 1254 based on a particular receiver processing technique to provide $N_T$ "detected" symbol streams. The RX data processor 1260 then demodulates, deinterleaves, and decodes each detected symbol stream to recover the traffic data for the data stream. The processing by the RX data processor 1260 is complementary to that performed by the TX MIMO processor 1220 and the TX data processor 1214 at the device 1210.

A processor 1270 periodically determines which pre-coding matrix to use (discussed below). The processor 1270 formulates a reverse link message comprising a matrix index portion and a rank value portion. A data memory 1272 may store program code, data, and other information used by the processor 1270 or other components of the device 1250.

The reverse link message may comprise various types of information regarding the communication link and/or the received data stream. The reverse link message is then processed by a TX data processor 1238, which also receives traffic data for a number of data streams from a data source 1236, modulated by a modulator 1280, conditioned by the transceivers 1254A through 1254R, and transmitted back to the device 1210.

At the device 1210, the modulated signals from the device 1250 are received by the antennas 1224, conditioned by the transceivers 1222, demodulated by a demodulator (DEMOD) 1240, and processed by a RX data processor 1242 to extract the reverse link message transmitted by the device 1250. The processor 1230 then determines which pre-coding matrix to use for determining the beam-forming weights then processes the extracted message.

FIG. 12 also illustrates that the communication components may include one or more components that perform transmit power control operations as taught herein. For example, a transmit power control component 1290 may cooperate with the processor 1230 and/or other components of the device 1210 to control transmit power for transmissions by the device 1210 (e.g., transmissions to another device such as the device 1250) as taught herein. It should be appreciated that for each device 1210 and 1250 the functionality of two or more of the described components may be provided by a single component. For example, a single processing component may provide the functionality of the transmit power control component 1290 and the processor 1230.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure may be described using 3GPP terminology, it is to be understood that the teachings herein may be applied to 3GPP (e.g., Re199, Re15, Re16, Re17) technology, as well as 3GPP2 (e.g., 1xRTT, 1xEV-DO Re10, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

Figure 13:
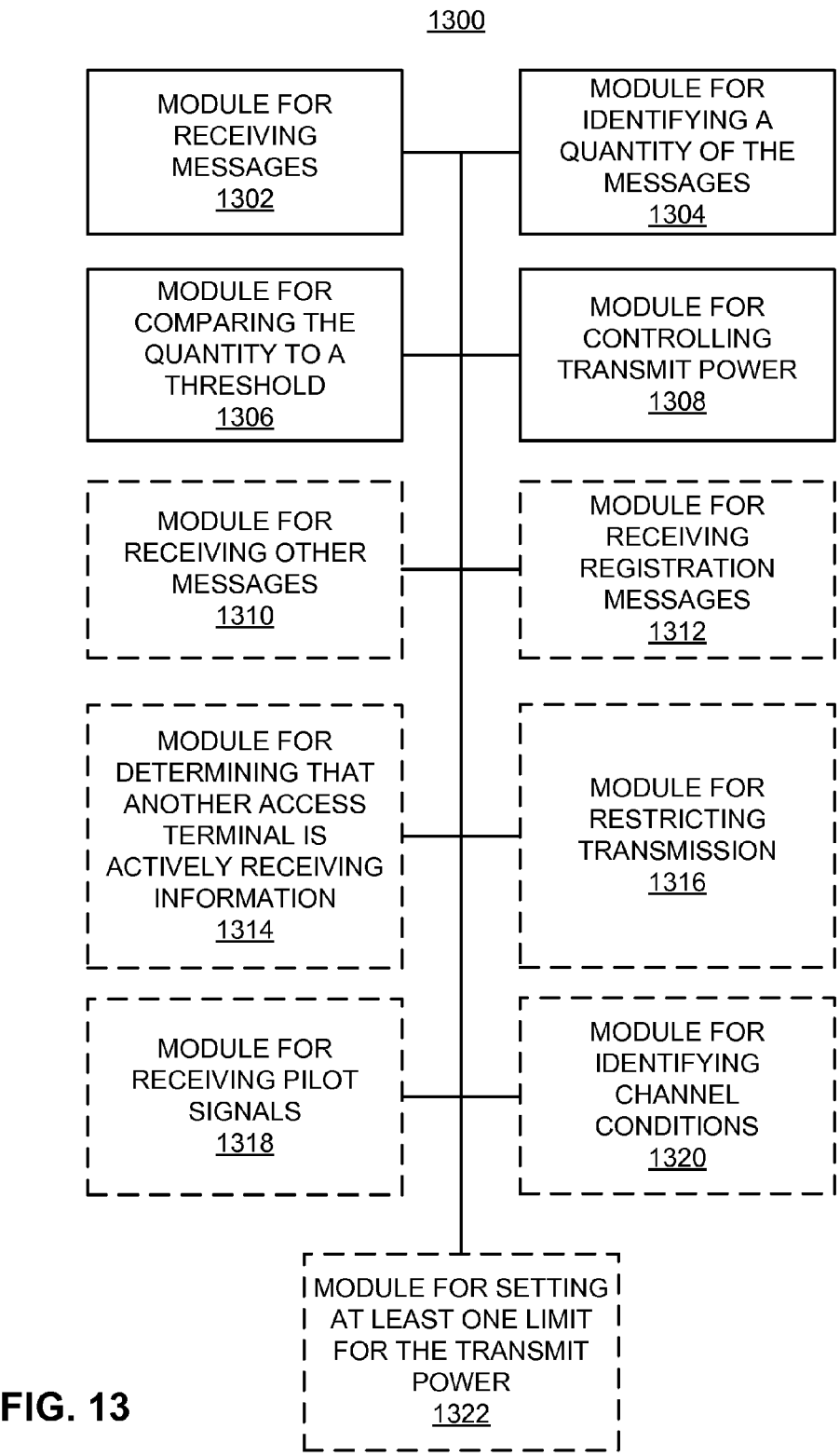
FIGS. 13-15 are simplified block diagrams of several sample aspects of apparatuses configured to control transmit power as taught herein.
Figure 14:
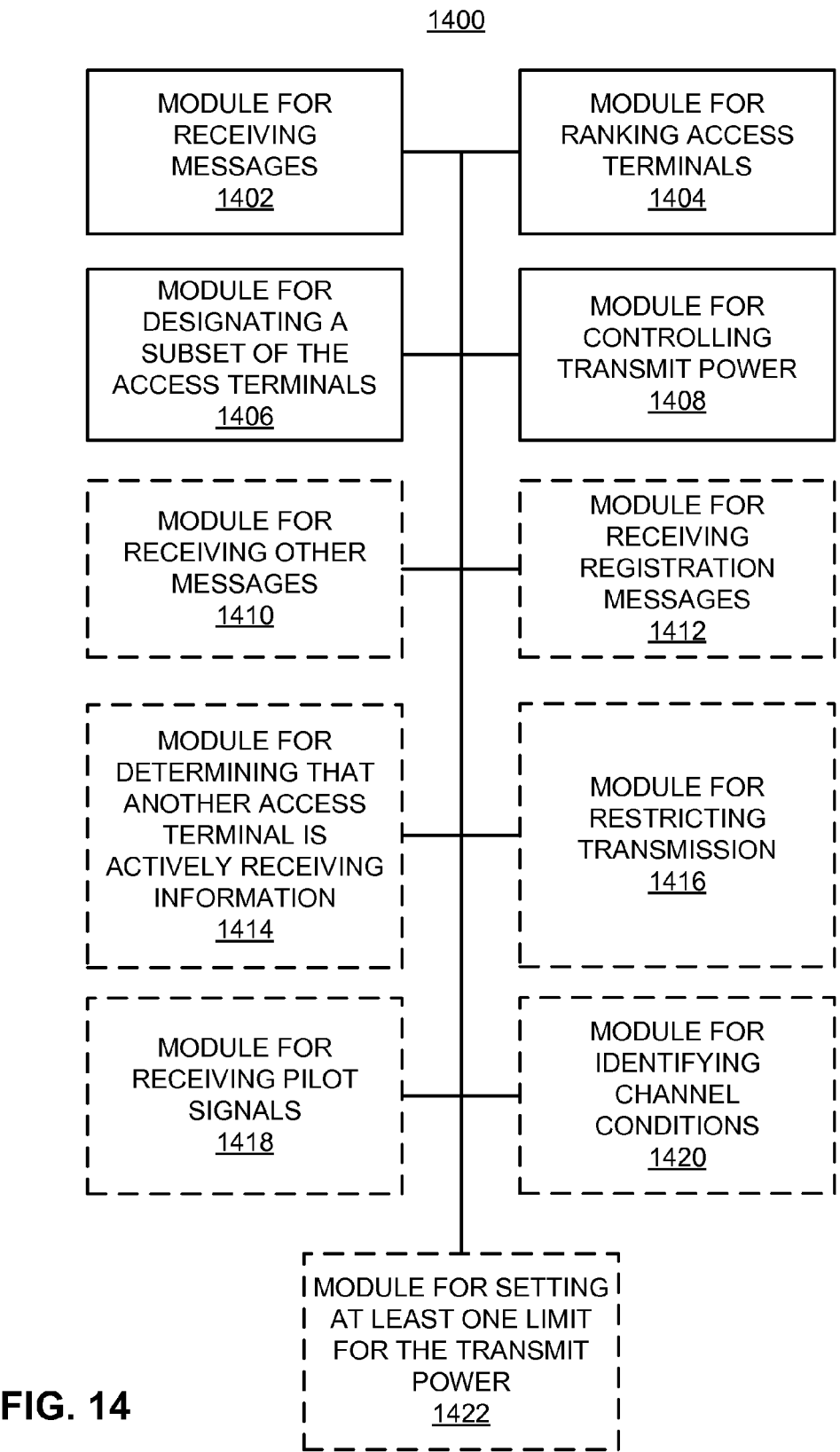
Figure 15:
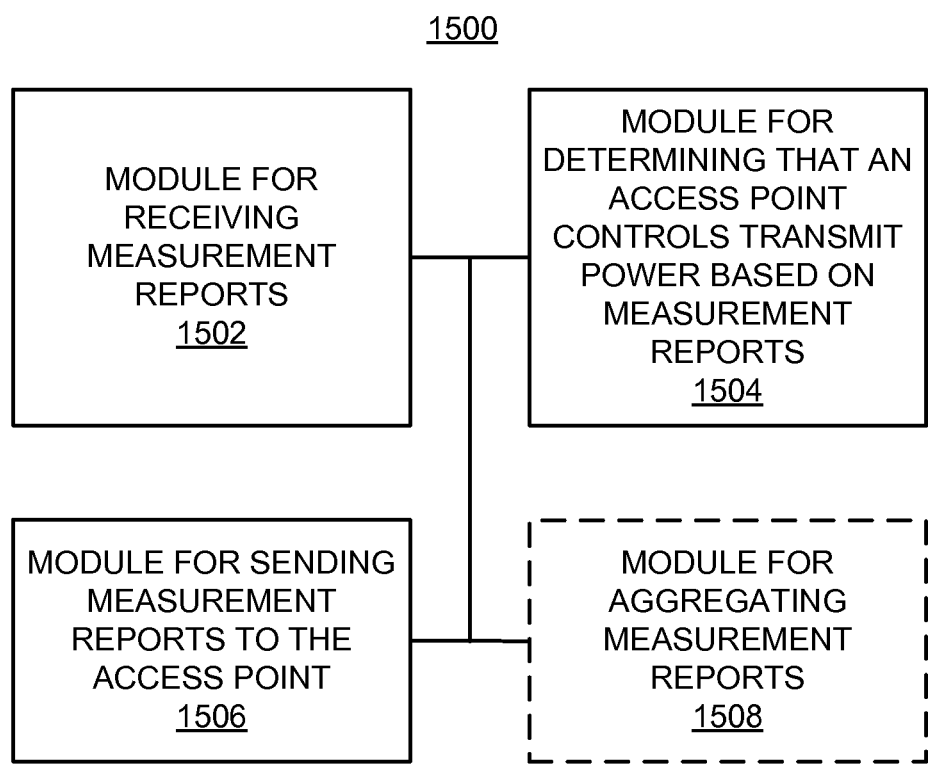

The functionality described herein (e.g., with regard to one or more of the accompanying figures) may correspond in some aspects to similarly designated "means for" functionality in the appended claims. Referring to FIGS. 13-15, apparatuses 1300, 1400, and 1500 are represented as a series of interrelated functional modules. Here, a module for receiving messages 1302 or 1404 may correspond at least in some aspects to, for example, a receiver as discussed herein. A module for identifying a quantity of the messages 1304 may correspond at least in some aspects to, for example, a controller as discussed herein. A module for comparing the quantity to a threshold 1306 may correspond at least in some aspects to, for example, a controller as discussed herein. A module for ranking access terminals 1404 may correspond at least in some aspects to, for example, a controller as discussed herein. A module for designating a subset of the access terminals 1406 may correspond at least in some aspects to, for example, a controller as discussed herein. A module for controlling transmit power 1308 or 1408 may correspond at least in some aspects to, for example, a controller as discussed herein. A module for receiving other messages 1310 or 1410 may correspond at least in some aspects to, for example, a receiver as discussed herein. A module for receiving registration messages 1312 or 1412 may correspond at least in some aspects to, for example, a receiver as discussed herein. A module for determining that another access terminal is actively receiving information 1314 or 1414 may correspond at least in some aspects to, for example, a controller as discussed herein. A module for restricting transmission 1316 or 1416 may correspond at least in some aspects to, for example, a controller as discussed herein. A module for receiving pilot signals 1318 or 1418 may correspond at least in some aspects to, for example, a receiver as discussed herein. A module for identifying channel conditions 1320 or 1420 may correspond at least in some aspects to, for example, a controller as discussed herein. A module for setting at least one limit for the transmit power 1322 or 1422 may correspond at least in some aspects to, for example, a controller as discussed herein. A module for receiving measurement reports 1502 may correspond at least in some aspects to, for example, a receiver as discussed herein. A module for determining that an access point controls transmit power based on measurement reports 1504 may correspond at least in some aspects to, for example, a controller as discussed herein. A module for sending measurement reports to the access point 1506 may correspond at least in some aspects to, for example, a transmitter as discussed herein. A module for aggregating measurement reports 1508 may correspond at least in some aspects to, for example, a controller as discussed herein.

The functionality of the modules of FIGS. 13-15 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein. In some aspects one or more of any dashed blocks in FIGS. 13-15 are optional.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit (IC), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. It should be appreciated that a computer-readable medium may be implemented in any suitable computer-program product.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of communication, comprising:
   receiving messages at an access point, wherein the messages comprise measurement reports from at least one access terminal that is not currently being served by the access point, and wherein the messages are received from another access point currently serving the at least one access terminal;

identifying a quantity of the messages that indicate the occurrence of a specified type of event, wherein the quantity is identified over a defined period of time;
comparing the quantity to a threshold; and
controlling transmit power of the access point based on the comparison.

2. The method of claim 1, wherein the specified type of event comprises a Universal Mobile Telecommunication System (UMTS) Event 1A.

3. The method of claim 1, wherein the messages are received from the at least one access terminal via a network backhaul.

4. The method of claim 1, wherein:
the quantity comprises an observed event count; and
the threshold comprises a target event count.

5. The method of claim 4, wherein the controlling of the transmit power comprises:
determining a power adjustment based on a difference between the target event count and the observed event count; and
adjusting the transmit power based on the determined power adjustment.

6. The method of claim 5, wherein the determination of the power adjustment comprises applying a monotonic non-decreasing function to the difference between the target event count and the observed event count.

7. The method of claim 1, wherein:
the access point comprises a femto cell; and
the at least one access terminal is currently being served by a macro cell.

8. The method of claim 1, further comprising receiving other messages from at least one access terminal that is currently being served by the access point, wherein:
the other messages are indicative of channel quality on a forward link of the access point; and
the controlling of the transmit power is further based on the other messages.

9. The method of claim 1, further comprising receiving registration messages at the access point, wherein:
the registration messages are indicative of a quantity of registration attempts by at least one access terminal that is not authorized to receive active mode service via the access point; and
the controlling of the transmit power is further based on the registration messages.

10. The method of claim 1, further comprising:
determining that another access terminal near the access point is actively receiving information from at least one other access point; and
restricting transmission by the access point as a result of the determination.

11. The method of claim 1, further comprising:
receiving pilot signals at the access point, wherein the pilot signals are received from at least one other access point;
identifying channel conditions at the access point based on the received pilot signals; and
setting at least one limit for the transmit power based on the identified channel conditions.

12. An apparatus for communication, comprising:
a receiver operable to receive messages, wherein the messages comprise measurement reports from at least one access terminal that is not currently being served by the apparatus, and wherein the messages are received from another apparatus currently serving the at least one access terminal; and
a controller operable to identify a quantity of the messages that indicate the occurrence of a specified type of event, wherein the quantity is determined over a defined period of time, and further operable to compare the quantity to a threshold, and further operable to control transmit power of the apparatus based on the comparison.

13. The apparatus of claim 12, wherein the specified type of event comprises a Universal Mobile Telecommunication System (UMTS) Event 1A.

14. The apparatus of claim 12, wherein the messages are received from the at least one access terminal via a network backhaul.

15. The apparatus of claim 12, wherein:
the quantity comprises an observed event count; and
the threshold comprises a target event count.

16. The apparatus of claim 15, wherein the controlling of the transmit power comprises:
determining a power adjustment based on a difference between the target event count and the observed event count; and
adjusting the transmit power based on the determined power adjustment.

17. The apparatus of claim 16, wherein the determination of the power adjustment comprises applying a monotonic non-decreasing function to the difference between the target event count and the observed event count.

18. The apparatus of claim 12, wherein:
the apparatus comprises a femto cell; and
the at least one access terminal is currently being served by a macro cell.

19. The apparatus of claim 12, wherein:
the receiver is further operable to receive other messages from at least one access terminal that is currently being served by the apparatus;
the other messages are indicative of channel quality on a forward link of the apparatus; and
the controlling of the transmit power is further based on the other messages.

20. The apparatus of claim 12, wherein:
the receiver is further operable to receive registration messages;
the registration messages are indicative of a quantity of registration attempts by at least one access terminal that is not authorized to receive active mode service via the apparatus; and
the controlling of the transmit power is further based on the registration messages.

21. The apparatus of claim 12, wherein the controller is further operable to: determine that another access terminal near the apparatus is actively receiving information from an access point; and
restrict transmission by the apparatus as a result of the determination.

22. The apparatus of claim 12, wherein:
the receiver is further operable to receive pilot signals from at least one access point;
the controller is further operable to identify channel conditions at the apparatus based on the received pilot signals; and
the controller is further operable to set at least one limit for the transmit power based on the identified channel conditions.

23. An apparatus for communication, comprising:
means for receiving messages, wherein the messages comprise measurement reports from at least one access terminal that is not currently being served by the apparatus, and wherein the messages are received from another apparatus currently serving the at least one access terminal;

means for identifying a quantity of the messages that indicate the occurrence of a specified type of event, wherein the quantity is determined over a defined period of time;

means for comparing the quantity to a threshold; and means for controlling transmit power of the apparatus based on the comparison.

24. The apparatus of claim 23, wherein:

the quantity comprises an observed event count; and the threshold comprises a target event count.

25. The apparatus of claim 24, wherein the controlling of the transmit power comprises:

determining a power adjustment based on a difference between the target event count and the observed event count; and adjusting the transmit power based on the determined power adjustment.

26. The apparatus of claim 25, wherein the determination of the power adjustment comprises applying a monotonic non-decreasing function to the difference between the target event count and the observed event count.

27. The apparatus of claim 23, wherein:

the apparatus comprises a femto cell; and the at least one access terminal is currently being served by a macro cell.

28. The apparatus of claim 23, further comprising:

means for determining that another access terminal near the apparatus is actively receiving information from an access point; and means for restricting transmission by the apparatus as a result of the determination.

29. The apparatus of claim 23, further comprising:

means for receiving pilot signals from at least one access point;

means for identifying channel conditions at the apparatus based on the received pilot signals; and means for setting at least one limit for the transmit power based on the identified channel conditions.

30. A non-transitory computer-program product, comprising:

computer-readable medium comprising code for causing a computer to:

receive messages at an access point, wherein the messages comprise measurement reports from at least one access terminal that is not currently being served by the access point, and wherein the messages are received from another access point currently serving the at least one access terminal;

identify a quantity of the messages that indicate the occurrence of a specified type of event, wherein the quantity is determined over a defined period of time;

compare the quantity to a threshold; and control transmit power of the access point based on the comparison.

31. The computer-program product of claim 30, wherein:

the quantity comprises an observed event count; and the threshold comprises a target event count.

32. The computer-program product of claim 31, wherein the controlling of the transmit power comprises:

determining a power adjustment based on a difference between the target event count and the observed event count; and adjusting the transmit power based on the determined power adjustment.

33. The computer-program product of claim 32, wherein the determination of the power adjustment comprises applying a monotonic non-decreasing function to the difference between the target event count and the observed event count.

34. The computer-program product of claim 30, wherein:

the access point comprises a femto cell; and the at least one access terminal is currently being served by a macro cell.

35. The computer-program product of claim 30, wherein the computer-readable medium further comprises code for causing the computer to:

determine that another access terminal near the access point is actively receiving information from another access point; and restrict transmission by the access point as a result of the determination.

36. The computer-program product of claim 30, wherein the computer-readable medium further comprises code for causing the computer to:

receive pilot signals at the access point, wherein the pilot signals are received from at least one other access point;

identify channel conditions at the access point based on the received pilot signals; and set at least one limit for the transmit power based on the identified channel conditions.

* * * * *